US006983373B2

(12) United States Patent
Furuya

(10) Patent No.: US 6,983,373 B2
(45) Date of Patent: Jan. 3, 2006

(54) INFORMATION PROCESSING APPARATUS, INFORMATION PROCESSING SYSTEM, INFORMATION PROCESSING METHOD, AND STORAGE MEDIUM THEREFOR

(75) Inventor: Yoji Furuya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 919 days.

(21) Appl. No.: 09/895,384

(22) Filed: Jul. 2, 2001

(65) Prior Publication Data

US 2002/0019813 A1 Feb. 14, 2002

(30) Foreign Application Priority Data

Jul. 4, 2000 (JP) .............................. 2000-202651

(51) Int. Cl.
*G06F 17/00* (2006.01)
(52) U.S. Cl. ....................... 713/193; 713/502; 713/600
(58) Field of Classification Search ................ 713/200, 713/201, 196, 500–600, 189–193
See application file for complete search history.

(56) References Cited

U.S. PATENT DOCUMENTS 6,557,102 B1 * 4/2003 Wong et al. ................. 713/176
6,832,319 B1 * 12/2004 Bell et al. .................... 713/193

OTHER PUBLICATIONS

"An Introduction to Microsoft NetShow Service", 1999, [Retrieved from Internet Feb. 28, 2005], http://system.cm-lab.csie.ntu.edu.tw/seminar/ns&asf.ppt.*
"Screen Shots", Dec. 2000, [Retrieved from Internet Feb. 28, 2005], http://dizzy.library.arizona.edu/library/teams/ust/software/pdf/screen-shot.pdf.*
High-speed nondirective optical communication for wireless networks; Barry, J.R.; Kahn, J.M.; Lee, E.A.; Messerschmitt, D.G.; Network, IEEE; vol. 5, Issue 6, Nov. 1991 pp.: 44-54 Digital Object Identifier 10.1109/65.103810.*
Hiding data accesses in steganographic file system; Xuan Zhou; HweeHwa Pang; Kian-Lee Tan; Data Engineering, 2004. Proceedings. 20th International Conference on; Mar. 30-Apr. 2, 2004 pp.: 572-583 Digital Object Identifier 10.1109/ICDE.2004.1320028.*
No more shadow boxing with online music piracy: strategic business models to enhance revenues; Bhattacharjee, S.; Lertwachara, K.; Gopal, R.D.; Marsden, J.R.;System Sciences, 2003. Proceedings of the 36th Annual Hawaii International Conference on.*

* cited by examiner

*Primary Examiner*—David Jung
(74) *Attorney, Agent, or Firm*—Fitzpatrick, Cella, Harper & Scinto

(57) ABSTRACT

It is one objective of the present invention to limit the frequency whereat a user can display or reproduce digital content data, such as photograph data or music data, and instead, to reduce the price of such digital content data and accelerate its sale via the Internet.

According to the present invention, an information processing apparatus comprises:

a reception unit, for externally receiving, via a network, a content data file to which an encrypted life counter has been added;

a processor, for processing the content data file;

a subtraction unit, for subtracting a specific value from the encrypted life counter; and a controller, for inhibiting the processing means from processing the content data file when the value held by the encrypted life counter has been reduced to a value smaller than the specific value.

48 Claims, 14 Drawing Sheets

FIG. 2

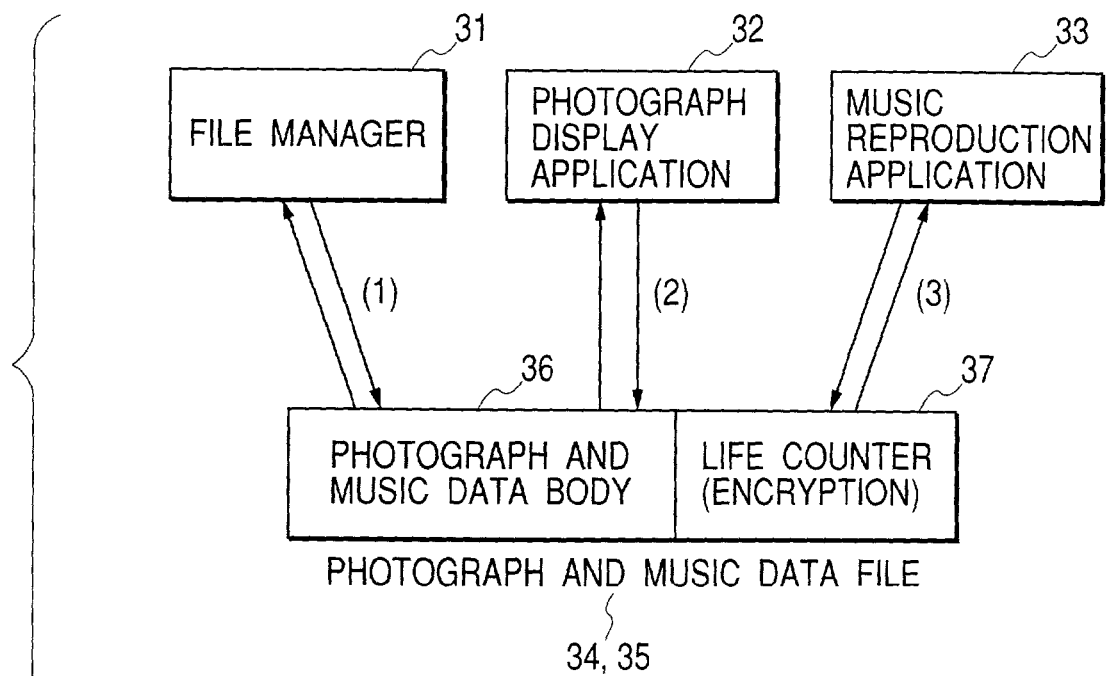

(1) IF IT COPIES, LIFE COUNTER OF TWO DATA FILES WILL DROP TO 1/2, RESPECTIVELY. LIFE COUNTER DOES NOT CHANGE IN MOVEMENT OF THE FILE.

(2) IF PHOTOGRAPH IS DISPLAYED ONCE WITH PHOTOGRAPH DISPLAY APPLICATION, LIFE COUNTER IS SUBTRACTED FOR 1.

(3) IF MUSIC REPRODUCTION IS PERFORMED ONCE WITH MUSIC REPRODUCTION APPLICATION, LIFE COUNTER WILL BE SUBTRACTED FOR 1. IN THE CASE OF MUSIC, LIFE COUNTER MAY BE MANAGED BY TIME AND MAY SUBTRACT THE LIFE COUNTER FOR MUSIC REPRODUCTION TIME.

INFORMATION PROCESSING APPARATUS, INFORMATION PROCESSING SYSTEM, INFORMATION PROCESSING METHOD, AND STORAGE MEDIUM THEREFOR

BACKGROUND OF THE INVENTION

1. Field of the Invention

The present invention relates to an information processing technique, and in particular, relates to a technique for processing content data.

2. Related Background Art

While use of the Internet is now widespread, because of unauthorized copying or alteration of photograph data or music data, conventionally there are few cases wherein the Internet has been used by photograph or music agencies to sell photograph or music data. For even if photograph data were sold, it would be very expensive, over a million yen per photo, for example, and although the Internet has been used for music transactions, the quality of the data handled in this manner tends to be lower than that of original recordings.

Logically, it can be anticipated that high resolution data prepared from a photograph will have an initial high cost; to acquire the necessary image data, special film scanners must be used and several megabytes of image data are needed to reproduce even a small photo.

Furthermore, a basic characteristic of photograph or music data is that they suffer no deterioration over time, and that the number of images that can be displayed and the number of musical pieces that can be reproduced is theoretically infinite.

Therefore, since digital content data is susceptible to repetitive copying, and since copies can be used to display photographs or to play music innumerable times, one of the main reasons digital content data is expensive is the risk posed by the unauthorized use of copies. This risk also makes it currently impractical for photography and music agencies to vend digital content data over the internet. Finally, although the use of home personal computers to sell photograph and music data has been the topic of much recent discussion, as of now, it is difficult to view such sales as an established means of marketing.

SUMMARY OF THE INVENTION

It is a first objective of the present invention to limit the frequency whereat a user can display or reproduce digital content data, such as photograph data or music data, and instead, to reduce the price of such digital content data and accelerate its sale via the Internet. Further, according to the invention, limitations imposed on the frequency at which data can be displayed and reproduced will be effective even when the copying of digital data is permitted.

It is a second objective of the present invention to achieve the first objective in a practical manner by using a peripheral device connected to a user's personal computer.

According to one aspect of the invention, an information processing apparatus comprises:

encryption means, for encrypting a life counter for content data;

addition means, for adding the encrypted life counter to a content data file; and transmission means, for externally transmitting, via a network, the content data file having the added life counter.

According to one more aspect of the invention, an information processing apparatus comprises:

reception means, for externally receiving, via a network, a content data file to which an encrypted life counter has been added;

processing means, for processing the content data file;

subtraction means, for subtracting a specific value from the encrypted life counter; and control means, for inhibiting the processing means from processing the content data file when the value held by the encrypted life counter has been reduced to a value smaller than the specific value.

According to another aspect of the invention, an information processing system is provided whereby a first information processing apparatus and a second information processing apparatus are interconnected, wherein the first information apparatus comprises:

encryption means, for encrypting a life counter for content data, addition means, for adding the encrypted life counter to a content data file, and transmission means, for transmitting, via a network, the content data file having the added life counter to the second information apparatus; and wherein the second information processing apparatus comprises:

reception means, for receiving, via a network, from the first information processing apparatus a content data file to which an encrypted life counter has been added, processing means, for processing the content data file, subtraction means, for subtracting a specific value from the encrypted life counter, and control means, for inhibiting the processing means from processing the content data file when the value held by the encrypted life counter has been reduced to a number smaller than the specific value.

According to an additional aspect of the invention, an information processing apparatus comprises:

data transmission means, for externally transmitting, via a network, a content data file;

life counter transmission means, for externally transmitting, via the network, a life counter for the content data file; and program transmission means, for externally transmitting, via the network, an application program file for processing the content data file.

According to a further aspect of the invention, an information processing apparatus comprises:

data reception means, for receiving, via a network, a content data file;

life counter reception means, for receiving, via the network, a life counter for the content data file;

program reception means, for receiving, via the network, an application program file for processing the content data file;

encryption means, for encrypting the life counter;

addition means, for adding the encrypted life counter to the content data file;

transmission means, for transmitting, via the network, the application program file to a different information processing apparatus; and control means, for permitting the reading only of the content data file for an application program that is currently being executed by the different information processing apparatus.

According to yet one more aspect of the invention, an information processing apparatus comprises:

reception means, for receiving, via a network, an application program file for processing content data from a different information processing apparatus;

processing means, for executing, via the network, the application program for processing content data stored in the different information processing apparatus;

subtraction means, for subtracting, via the network, a specific value from a life counter for the content data stored in the different information processing apparatus each time the content data file is processed; and control means, for inhibiting the processing means from processing content data when the value held by the encrypted life counter has been reduced to a value smaller than the specific value.

According to yet another aspect of the invention, an information processing system is provided whereby a first information processing apparatus, a second information processing apparatus and a third information processing apparatus are interconnected, wherein the first information processing apparatus comprises:

data transmission means, for transmitting, via a network, a content data file to the second information processing apparatus, life counter transmission means, for transmitting, via the network, a life counter for the content data file to the second information processing apparatus, and program transmission means, for transmitting, via the network, an application program file for processing the content data file to the second information processing apparatus;

wherein the second information processing apparatus comprises:

data reception means, for receiving, via the network, the content data file from the first information apparatus, life counter reception means, for receiving, via the network, a life counter for the content data file from the first information processing apparatus, program reception means, for receiving, via the network, an application program file for processing the content data file from the first information processing apparatus, encryption means, for encrypting the life counter, addition means, for adding the encrypted life counter to the content data file, transmission means, for transmitting, via the network, the application program file to the third information processing apparatus, and control means for permitting the reading of the content data file only for an application program that is currently being executed by the third information processing apparatus; and wherein the third information processing apparatus comprises:

reception means, for receiving, via the network, an application program file for processing content data received from the second information processing apparatus, processing means, for executing, via the network, the application program for processing content data stored in the second information processing apparatus;

subtraction means, for subtracting, via the network, a specific value from a life counter for the content data stored in the different information processing apparatus each time the content data file is processed, and control means, for inhibiting the processing means from processing content data when the value held by the encrypted life counter has been reduced a value smaller than the specific value.

According to yet an additional aspect of the invention, an information processing method comprises the steps of:

(a) encrypting a life counter for content data;

(b) adding the encrypted life counter to a content data file; and (c) for externally transmitting, via a network, the content data file having the added life counter.

According to yet a further aspect of the invention, an information processing method comprises the steps of:

(a) externally receiving, via a network, a content data file to which an encrypted life counter has been added;

(b) processing the content data file;

(c) subtracting a specific value from the encrypted life counter; and (d) inhibiting the step (b) for processing the content data file when the value held by the encrypted life counter has been reduced to a value smaller than the specific value.

According to yet one further aspect of the invention, an information processing method comprises the steps of:

(a) externally transmitting, via a network, a content data file;

(b) externally transmitting, via the network, a life counter for the content data file; and (c) externally transmitting, via the network, an application program file for processing the content data file.

According to still one more aspect of the invention, an information processing method comprises the steps of:

(a) receiving, via a network, a content data file;

(b) receiving, via the network, a life counter for the content data file;

(c) receiving, via the network, an application program file for processing the content data file;

(d) encrypting the life counter;

(e) adding the encrypted life counter to the content data file;

(f) transmitting, via the network, the application program file to a different information processing apparatus; and (g) permitting the reading only of the content data file for an application program that is currently being executed by the different information processing apparatus.

According to still another aspect of the invention, an information processing method comprises the steps of:

(a) receiving, via a network, an application program file for processing content data from a different information processing apparatus;

(b) executing, via the network, the application program for processing content data stored in the different information processing apparatus;

(c) subtracting, via the network, a specific value from a life counter for the content data stored in the different information processing apparatus each time the content data file is processed; and (d) inhibiting the step (b) for processing content data when the value held by the encrypted life counter has been reduced to a value smaller than the specific value.

According to still an additional aspect of the invention, a computer-readable storage medium is provided on which a program is stored that permits a computer to perform:

(a) a process for encrypting a life counter for content data;

(b) a process for adding the encrypted life counter to a content data file; and (c) a process for externally transmitting, via a network, the content data file having the added life counter.

According to still a further aspect of the invention, a computer-readable storage medium is provided on which a program is stored that permits a computer to perform:

(a) a process for externally receiving, via a network, a content data file to which an encrypted life counter has been added;

(b) a process for processing the content data file;

(c) a process subtracting a specific value from the encrypted life counter; and (d) a process for inhibiting the step (b) for processing the content data file when the value held by the encrypted life counter has been reduced to a value smaller than the specific value.

According to again one more aspect of the invention, a computer-readable storage medium is provided on which a program is stored that permits a computer to perform:

(a) a process for externally transmitting, via a network, a content data file;

(b) a process for externally transmitting, via the network, a life counter for the content data file; and (c) a process for externally transmitting, via the network, an application program file for processing the content data file.

According to again another aspect of the invention, a computer-readable storage medium is provided on which a program is stored that permits a computer to perform:

(a) a process for receiving, via a network, a content data file;

(b) a process for receiving, via the network, a life counter for the content data file;

(c) a process for receiving, via the network, an application program file for processing the content data file;

(d) a process for encrypting the life counter;

(e) adding the encrypted life counter to the content data file;

(f) a process for transmitting, via the network, the application program file to a different information processing apparatus; and (g) a process for permitting the reading only of the content data file for an application program that is currently being executed by the different information processing apparatus.

According to again an additional aspect of the invention, a computer-readable storage medium is provided on which a program is stored that permits a computer to perform:

(a) a process for receiving, via a network, an application program file for processing content data from a different information processing apparatus;

(b) a process for executing, via the network, the application program for processing content data stored in the different information processing apparatus;

(c) a process for subtracting, via the network, a specific value from a life counter for the content data stored in the different information processing apparatus each time the content data file is processed; and (d) a process for inhibiting the step (b) for processing content data when the value held by the encrypted life counter has been reduced to a value smaller than the specific value.

According to the present invention, a life counter is added to content data, and the value held by the life counter is reduced in accordance with the frequency the content data, which may be either photograph data or music data, is displayed or printed or is reproduced, or in accordance with a reproduction period. When the value held by the life counter has been reduced a number smaller than a predetermined value, the display, printing or reproduction of the content data is inhibited. And since the life counter is encrypted before it is added to the content data, a user cannot increase the value held by the life counter without permission.

BRIEF DESCRIPTION OF THE DRAWINGS

FIG. 2 is a second explanatory diagram showing the principle of the first embodiment of the present invention;

DETAILED DESCRIPTION OF THE PREFERRED EMBODIMENTS

The preferred embodiments of the present invention will now be described while referring to the accompanying drawings.

<First Embodiment>

Figure 1:
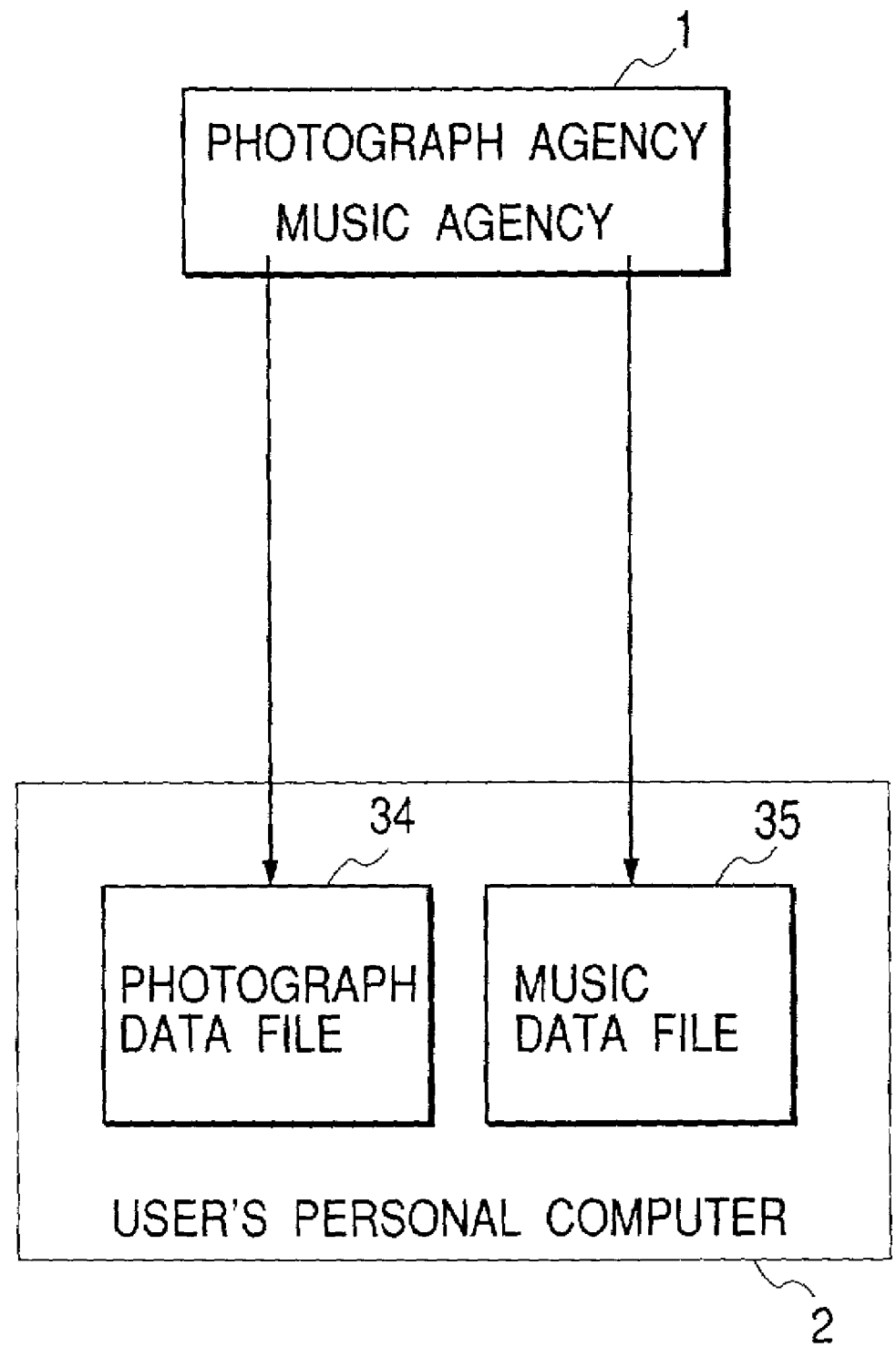
FIG. 1 is a first explanatory diagram showing the principle of a first embodiment of the present invention.

FIG. 1 is a first explanatory diagram of the principle of an information processing system according to a first embodiment of the present invention, and shows the general processing performed when contact data is purchased via the Internet.

First, the components of the system will be described. The information processing system comprises a web server 1, used by a photograph agency or a music agency, and a user's personal computer 2. The user's personal computer 2 includes an Internet connection function.

A user employs the user's personal computer 2 to connect to the web server 1 of the photograph agency or the music agency via the Internet, and desires to purchase photograph data or music data. At this time, the credit card number of the user is transmitted, by the user, to the web server 1. Then, the photograph data or the music data is transmitted to the user's personal computer 2, and is stored as a photograph data file 34 or a music data file 35 in an external storage device 29 of the user's personal computer 2. When the transmission of the data file has been completed, based on the credit card number of the user, the web server 1 charges a fee for the content data, such as photograph data or music data.

FIG. 2 is a second explanatory diagram of the principle of the information processing system according to the embodiment of the present invention, and is used to explain the operation of the user's personal computer 2 of this embodiment. The user's personal computer 2 includes a file manager 31, a photograph display application 32 and a music reproduction application 33, in addition to the photograph data file 34 and the music data file 35.

The photograph data file 34 or the music data file 35, which are purchased via the Internet and stored in the external storage device 29 of the user's personal computer 2, includes data for a main data portion 36 and an encrypted life counter 37.

The data in the photograph data file 34 are used by the photograph display application 32 to prepare a photograph for display, and each time the data are thus employed, the photograph display application 32 decrements, by one, the value held by the relevant life counter 37. Then, when the value held by the relevant life counter 37 has been decremented until it is less than 1, as a result of the repetitive display of the photograph, the data in the photograph data file 34 can no longer be used by the photograph display application 32 to display the photograph.

Similarly, the data in the music data file 35 are used by the music display application 33 to prepare music for reproduction, and each time the data are thus employed, the music display application 33 decrements, by one, the value held by the relevant life counter 37. Then, when the value held by the relevant life counter 37 has been decremented until it is less than 1, as a result of the repetitive reproduction of music, the data in the music data file 35 can no longer be used by the music display application 33 to reproduce the music.

Further, when the file manager 31 makes a copy of the photograph data file 34 or the music data file 35, the values held by the life counters 37 of both the source file that is copied and the destination file are reduced by half. That is, the final, total value held by the two life counters 37 is the same as that held by the life counter 37 of the source file at the time the copy was made. And when a file is moved by the file manager 31, the value held by the life counter 37 at the new location is the same as that it held at the time the move was initiated.

In the above description, the value held by a life counter 37 is determined in correlation with the display or reproduction frequency; however, when the content data is for music or video, the life counter 37 may be correlated with a reproduction time. For example, when the initial value held by a life counter 37 for music data is "five hours", and when a user has employed the music reproduction application 33 to reproduce music for thirty minutes, the value held by the life counter for the music data will be decremented by "thirty minutes" and will be reset to "four hours and thirty minutes". And when, by the repetitive reproduction of the music the value held by the life counter has been reduced until "0 minutes" is reached, at that time, further reproduction will be inhibited. In addition, during a copying operation performed by the file manager 31, the same condition will still apply, that the life counters 37 of the source file that is copied and the destination file will each be reduced by half. Further, a video data file may be employed in the same manner as is a music data file 35, and in this case, a video reproduction application will reproduce the data in a video data file and will control the value held by a life counter 37.

Figure 3:
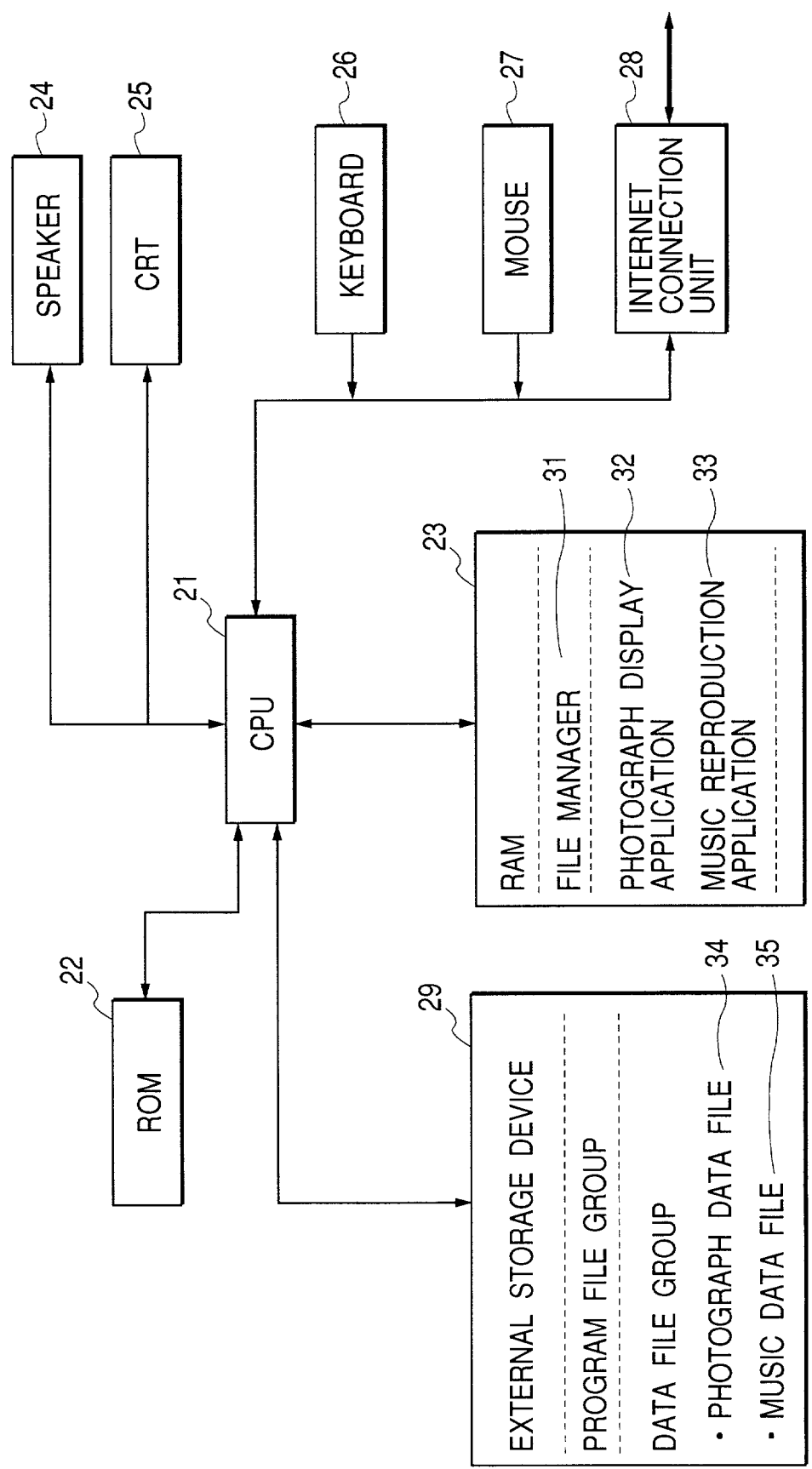
FIG. 3 is a block diagram showing the configuration of a user's personal computer.

FIG. 3 is a block diagram showing the configuration of the user's personal computer 2.

A central processing unit (hereinafter referred to as a "CPU") 21 provides overall control for the personal computer 2, and an operating system program (hereinafter referred to as an "OS"), which controls all the operations performed by the personal computer 2, and display fonts are stored in a read only memory (hereinafter referred to as a "ROM") 22.

A random access memory (hereinafter referred to as a "RAM") 23 is used to hold various programs, stored in the external storage device 29, that are loaded into it for execution, and is also used as a work area for the OS or other programs that are executed.

In the state in FIG. 3, a program in a program file group has been loaded from the external storage device 29 to the RAM 23, and the file manager 31, the photograph display application 32 and the music reproduction application 33 are currently being employed. While the file manager 31 is part of the OS, a part of the OS is also included in the program file group of the external storage device 29.

A data file group is also stored in the external storage device 29, and the photograph data file 34 and the music data file 35 are included in this group.

A speaker 24 is used to reproduce music or other sounds, a CRT 25 is a display device for the user's personal computer 2, a keyboard 26 is used as a character entry device, and a mouse 27 is used as a pointing device.

An Internet connection unit 28 is used for effecting a connection with the web server 1, which belongs to a photograph agency or a music agency.

The operation of the information processing system for the first embodiment of the present invention will now be described while referring to flowcharts.

Figure 4:
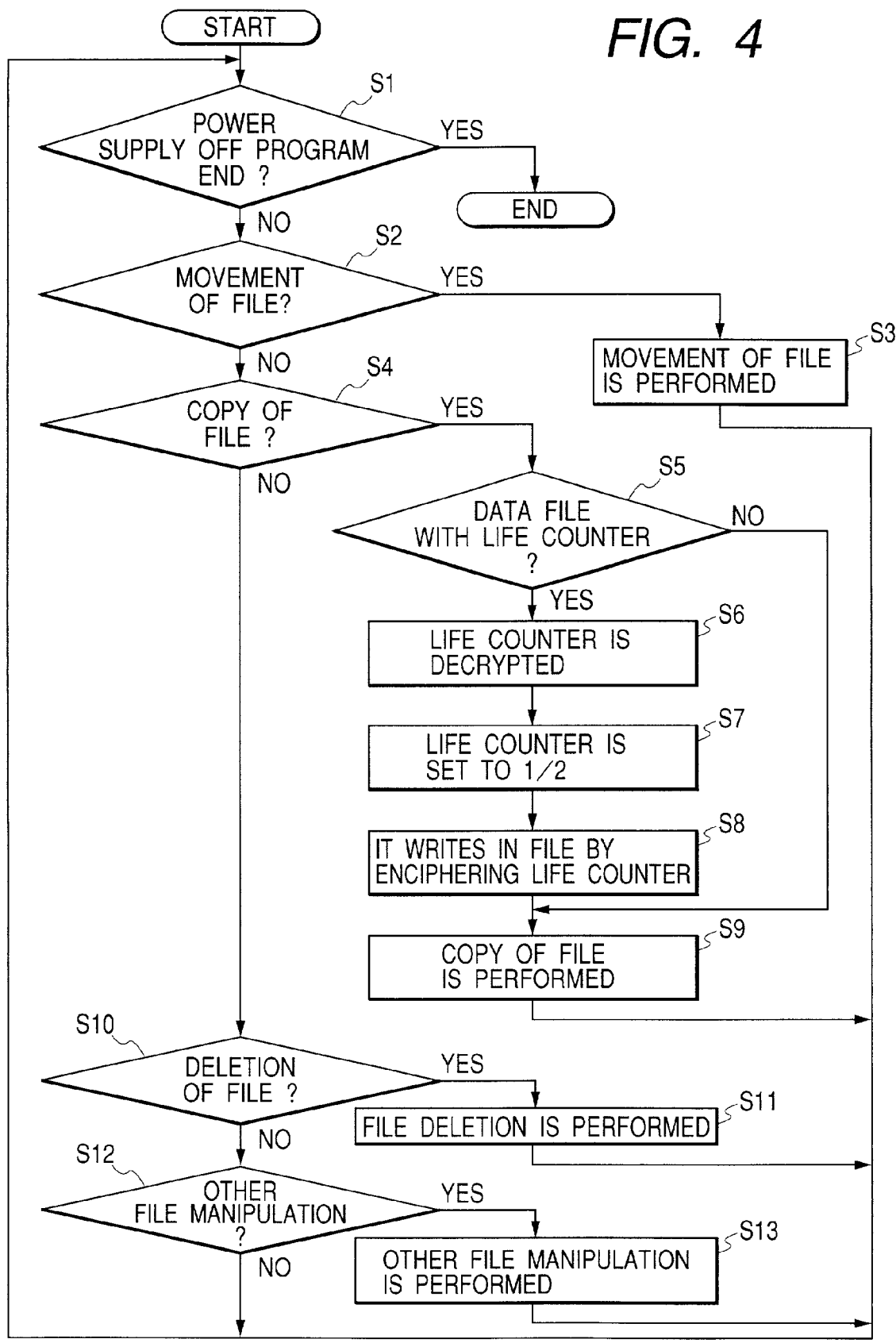
FIG. 4 is a flowchart for explaining the operation of a file manager.

FIG. 4 is a flowchart for explaining the processing performed by the file manager 31 of the user's personal computer 2. This program is activated by the user.

First, at step S1 a check is performed to determine whether the user has turned off the personal computer 2 or has issued a program end instruction. If the decision is YES, the program is terminated.

When the decision at step S1 is NO, at step S2 a check is performed to determine whether the user has issued an instruction for the movement of a file. If the decision at step S2 is YES, at step S3 the movement of the file is performed, and thereafter, program control returns to a position immediately preceding step S1 and loops while waiting for the next instruction to be issued by the user.

When the decision at step S2 is NO, at step S4, a check is performed to determine whether the user has issued a file copy instruction. If the decision at step S4 is YES, at step S5 a check is performed to determine whether the source file that is copied is a data file that includes a life counter. If the decision at step S5 is YES, at step S6 the encrypted life counter is decrypted and at step S7 the value held by the life counter is reduced by half, after which, at step S8, the life counter is encrypted and is again written into the file. Then, at step S9 the copying of the file is performed. In this fashion, two data files, the source file and the copy, are obtained whose life counters each hold half the value originally held.

When the decision at step S5 is NO, program control jumps to step S9 and a simple file copy process is performed.

Following step S9, program control returns to a position immediately preceding step S1 and loops while waiting for the next instruction to be issued by the user.

When the decision at step S4 is NO, at step S10 a check is performed to determine whether the user has issued a file deletion instruction. If the decision is YES, at step S11 the file is deleted. Thereafter, program control returns to a position immediately preceding step S1 and loops while waiting for the next instruction to be issued by the user.

When the decision at step S10 is NO, at step S12 a check is performed to determine whether the user has issued an instruction for other file operations. If the decision is YES, at step S13 that file operation is performed. In this case, the "other file operations" include the display of detailed information for a file.

Following step S13, or when the decision at step S12 is NO, program control returns to a position immediately preceding step S1 and loops while waiting for the next instruction to be issued by the user.

Figure 5:
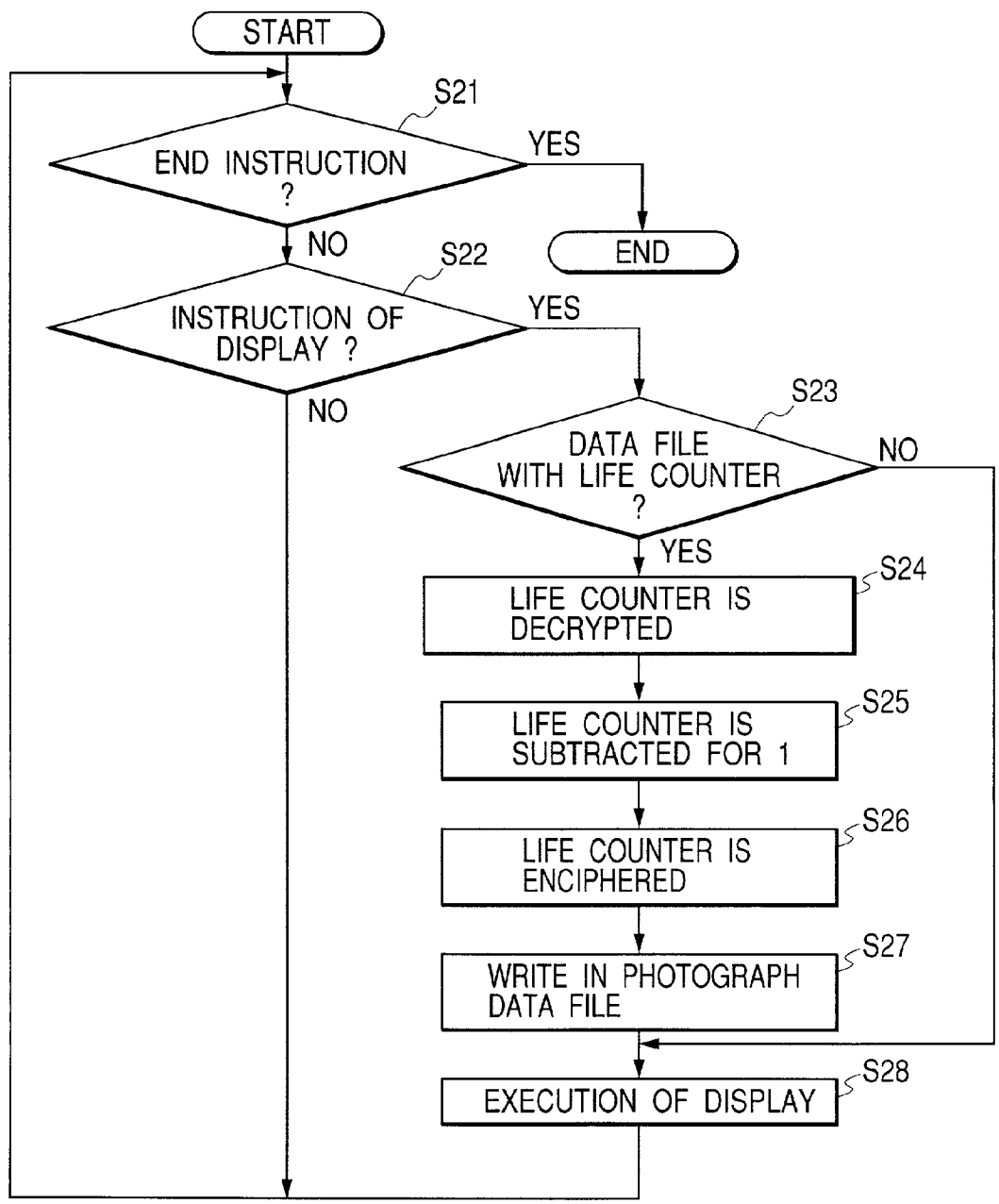
FIG. 5 is a flowchart for explaining the operation of a photograph display application.

FIG. 5 is a flowchart for explaining the processing performed by the photograph display application 32 of the user's personal computer 2. This program is activated upon the receipt of an instruction by a user.

First, at step S21 a check is performed to determine whether the user has issued an end instruction. If the decision is YES, the program is terminated. But if the decision is NO, at step S22 a check is performed to determine whether the user has issued a photograph data file display instruction. If the decision is YES, at step S23 a check is performed to determine whether the data file is one that includes a life counter. When the decision is YES, at step S24 the encrypted life counter is decrypted and at step S25 the value held by the life counter is decremented by one. Then, at step S26 the life counter is encrypted and at step S27 is again written into the photograph data file. Following this, at step S28, the data in the photograph data file is used to display a photograph.

When the decision at step S23 is NO, program control jumps to step S28 and the photograph data is used to perform a simple process for the display of a photograph.

Following step S28, or when the decision at step S22 is NO, program control returns to a position immediately preceding step S21 and loops while waiting for the next instruction to be issued by the user.

During this processing, the decrementing of the value held by a life counter has been performed before photograph data was used to display a photograph; however, the value held by a life counter may normally be decremented afterwards.

Figure 6:
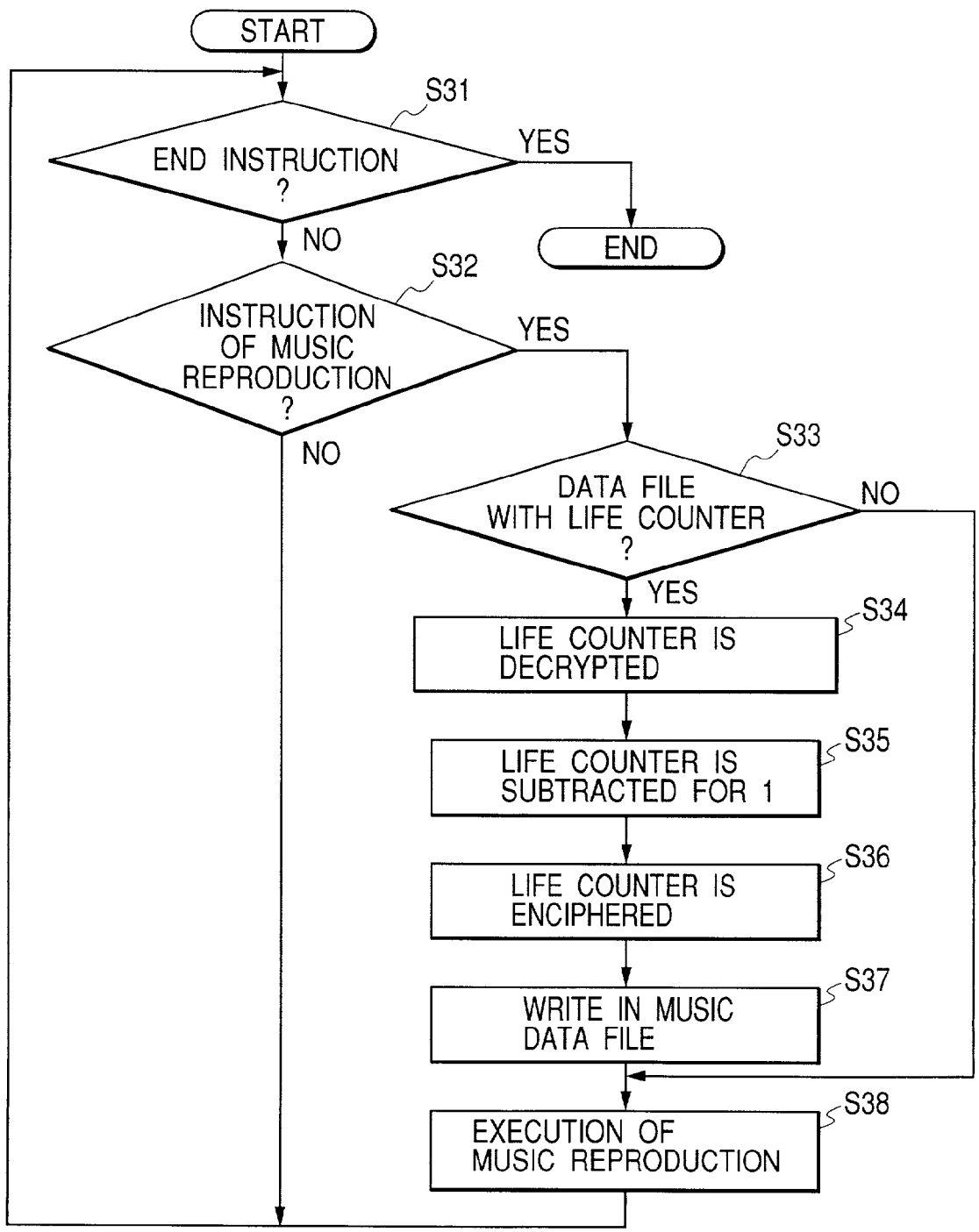
FIG. 6 is a flowchart for explaining the operation of a music reproduction application.

FIG. 6 is a flowchart for explaining the processing performed by the music reproduction application 33 of the user's personal computer 2. This program is activated upon the receipt of an instruction from a user.

First, at step S31 a check is performed to determine whether the user has issued an end instruction. If the decision is YES, the program is terminated. But if the decision is NO, at step S32 a check is performed to determine whether the user has issued a music data file reproduction instruction. If the decision is YES, at step S33 a check is performed to determine whether the data file is one that includes a life counter. When the decision is YES, at step S34 the encrypted life counter is decrypted, and at step S35 the value held by the life counter is decremented by one. Then, at step S36 the life counter is encrypted and at step S37 is again written into the music data file. Following this, at step S38, the data in the music data file is used to reproduce the music.

When the decision at step S33 is NO, program control jumps to step S38 and the music data is used to perform a simple process for the reproduction of the music.

Following step S38, or when the decision at step S32 is NO, program control returns to a position immediately preceding step S31 and loops while waiting for the next instruction to be issued by the user.

During this processing, the value held by the life counter is determined in correlation with the frequency at which music is reproduced; however, the value held by the life counter may also be determined in correlation with music reproduction time. For example, if at the time of sale the initial value held by a music data file life counter is three hours, when as a result of repetitively reproducing the music the cumulative time used reaches three hours, further reproduction of the music is inhibited.

During this processing, the decrementing of the value held by a life counter has been performed before the reproduction of music data; however, the value held by the life counter may be decremented after the music data has been normally reproduced.

<Effects in the First Embodiment>

In this embodiment, to limit the frequency at which a photograph is displayed or music is reproduced, a life counter is added to a photograph data file or a music data file, and each time the photograph is displayed or the music is reproduced, the value held by the life counter is decremented by one. Thus, the price of the photograph data or music data can be reduced.

Then, since the prices of photograph data and music data can be reduced, photograph data and music data can more easily be sold to users of home personal computers via the Internet.

Further, when copying a photograph data file or a music data file, the values held by the life counters of the source file that is copied and the destination file will each be reduced by half, so that the total value held by the life counters is unchanged. That is, the total frequency for the display of a picture or the reproduction of music is unchanged, even after a copying operation has been performed. As is described above, since a copying operation can be performed when the copy frequency is limited, this provision is convenient for users.

In this embodiment, for a music data file, time may be allocated for a life counter for the reproduction of music. Thus, even when reproduction of music for a short period of time is repeated, the value held by the life counter is not drastically reduced.

<Second Embodiment>

In the first embodiment, file copying is performed by the file manager 31 of the user's personal computer 2. And when a photograph data file or a music data file that includes a life counter is copied, values held by the life counters included in the source file that is copied and the destination file are set so they each hold half of an allocated value.

However, in actuality, the file manager 31 belongs to the OS, and can not be easily supplied by a maker other than the producer of the software for the pertinent OS.

Furthermore, once a user creates a program tool that will simply copy any file, copies of files can be produced without reducing by half the values held by their life counters. In other words, unauthorized copying is easily performed.

Therefore, in a second embodiment, to prevent the unauthorized copying of files by a user an Internet connection function is provided for a printer serving as a peripheral device connected to a user's personal computer 2, and photograph data files and music data files are stored in an external storage device of the printer. The second embodiment will now be described while referring to the drawings.

Figure 7:
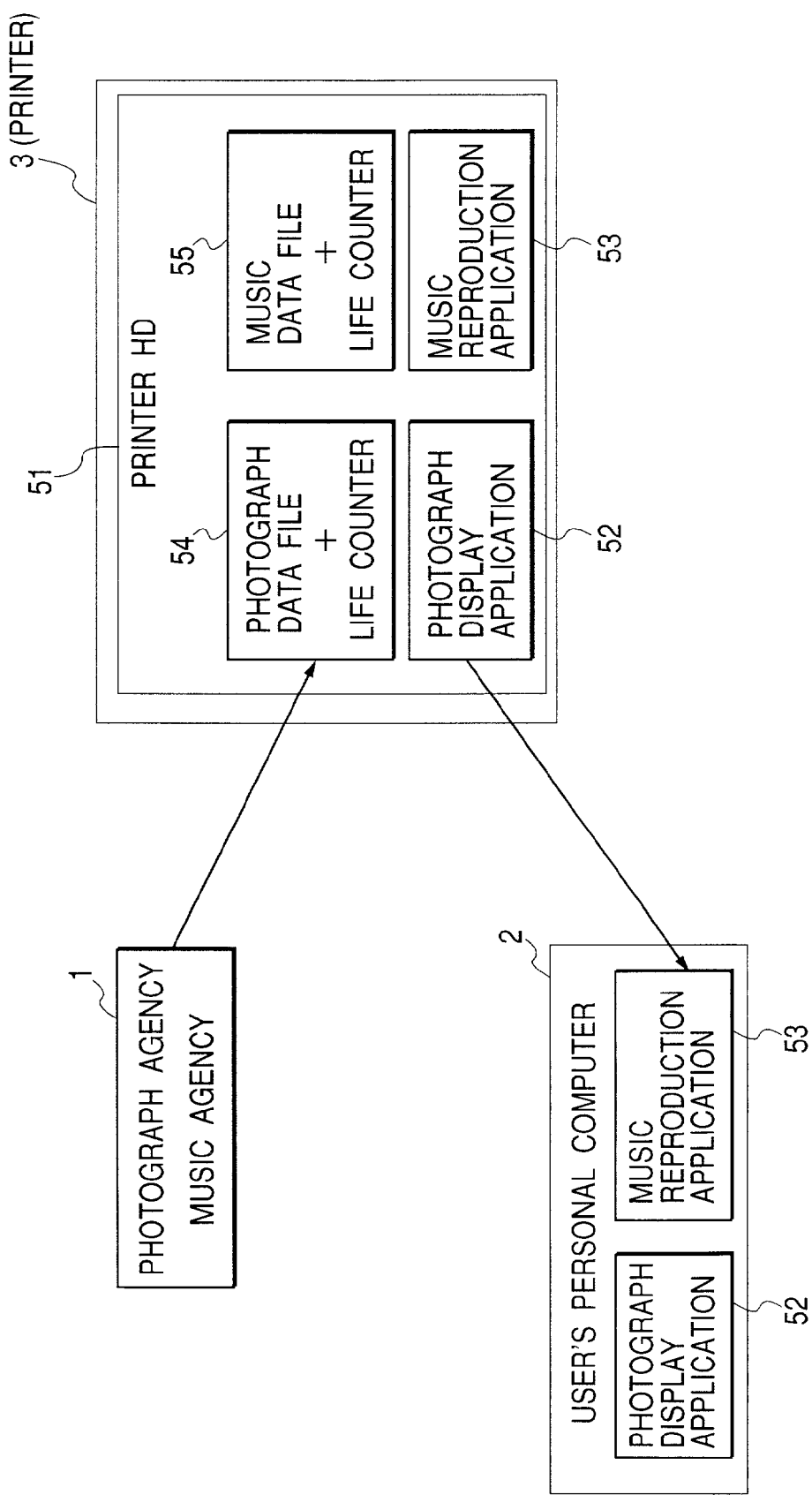
FIG. 7 is a explanatory diagram showing the principle of a second embodiment of the present invention.

FIG. 7 is a diagram for explaining the principle of an information processing system according to the second embodiment, and for showing the processing performed when content data, such as photograph data and music data, is purchased via the Internet.

First, the components of the information processing system will be described. The information processing system comprises: a web server 1, belonging to an entity such as a photograph agency or a music agency; a user's personal computer 2; and a printer 3, connected to the user's personal computer 2. The printer 3 includes an Internet connection function, and a hard disk (hereinafter referred to as an HD) 51, which is an incorporated, external storage device.

First, via the Internet, a user connects the personal computer 2 to the web server 1, belonging to an entity such as a photograph agency or a music agency. Then, for the selection of a photograph, thumbnail images, prepared using photograph data, are received and displayed on the CRT of the personal computer 2, and the user scans the images to determine which photograph data to purchase; or for the selection of music, a list of music data is received and displayed on the CRT of the personal computer 2, and the user scans the list to determine which music data to purchase. Once a decision has been made, user disconnects the computer 2 from the Internet.

Thereafter, the user instructs the printer 3, which is connected to the personal computer 2, to purchase the selected photograph data or music data, and also transmits to the printer 3 the credit card number that is to be used. The printer 3 is then connected, via the Internet, with the web server 1, belonging to the photograph agency or the music agency, and it transmits to the web server 1, as instructed by the user, a purchase request for the selected photograph data or music data and the credit card number. Subsequently, the printer 3 receives from the web server 1 the photograph data or music data and stores the content data in a data file 54 or 55 on the hard disk 51, the incorporated external storage device. Since the data for the life counter is received at the same time from the web server 1, the life counter is encrypted and the encrypted life counter is written to the photograph data file 54 or the music data file 55.

In addition, if a photograph display application program file 52 is not stored in the external storage device 51 of the printer 3, immediately after the content data for the photograph data file 54 is received a photograph display application program file 52 is also received and stored in the external storage device 51; or if a music reproduction application program file 53 is not stored in the external storage device 51 of the printer 3, immediately after the content data for the music data file 55 is received a music reproduction application program file 53 is also received and stored in the external storage device 51.

At this time, the web server 1, belonging to the photograph agency or the music agency, employs the credit card number furnished by the user to assess a fee for the photograph data or music data that was transmitted.

While the photograph data file 54 or the music data file 55, including the life counter, stored in the printer 3 is not visible to the user's personal computer 2, the photograph display application program file 52 or the music reproduction application program file 53 is.

Thus, the user can employ the user's personal computer 2 to read and execute the photograph display application program file 52 or the music reproduction application program file 53, and since the photograph data file 54 or the music data file 55, including the life counter, in the printer 3 is visible to the photograph display application 52 or the music reproduction application 53, the data file is opened and a photograph is displayed or music is reproduced.

Since neither the photograph display application 52 nor the music reproduction application 53 include a copying function, however, the user can not fetch the photograph data file 54 or the music data file 55 from the external storage device 51 of the printer 3 and store it in the personal computer 2.

Figure 8:
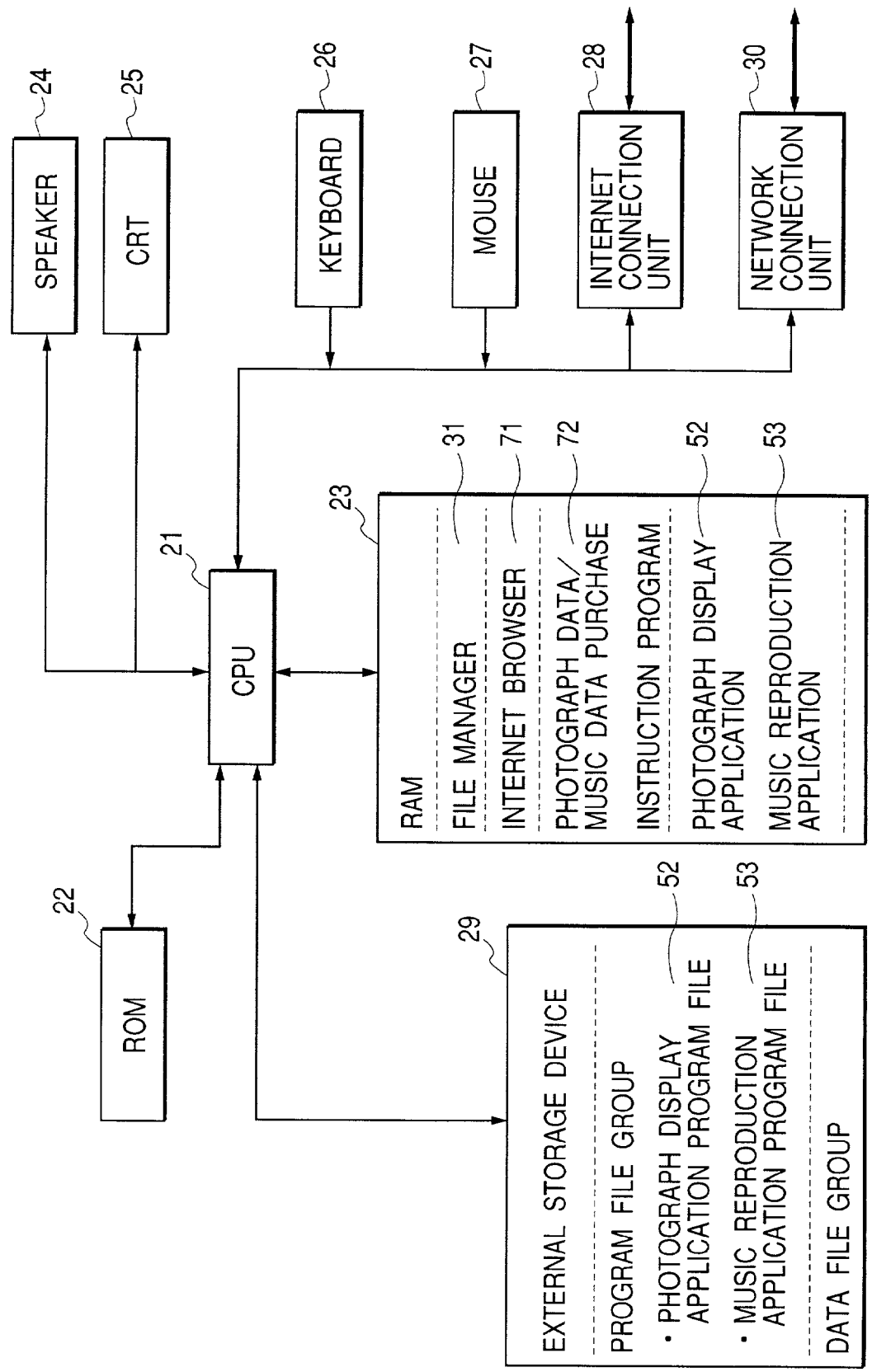
FIG. 8 is a block diagram showing the configuration of a user's personal computer.

FIG. 8 is a block diagram showing the configuration of the user's personal computer 2.

A central processing unit (hereinafter referred to as a "CPU") 21 provides overall control for the personal computer 2, and an operating system program (hereinafter referred to as an "OS"), which controls all the operations performed by the personal computer 2, and display fonts are stored in a read only memory (hereinafter referred to as a "ROM") 22.

A random access memory (hereinafter referred to as a "RAM") 23 is used to hold various programs, stored in an external storage device 29, that are loaded into it for execution, and is also used as a work area for the OS or other programs that are executed.

In the state shown in FIG. 8, various programs in a program file group stored in the external storage device 29 have been loaded into the RAM 23, and the file manager 31, an Internet browser 71, a photograph data/music data purchase instruction program 72, the photograph display application 52 and the music reproduction application 53 are currently being executed. While the file manager 31 belongs to the OS, one part of the OS is also included in the program file group stored in the external storage device 29.

A speaker 24 is used to reproduce music or other sounds, a CRT 25 is a display device for the user's personal computer 2, a keyboard 26 is used as a character entry device, and a mouse 27 is used as a pointing device.

An Internet connection unit 28 is used for connection to the web server 1, belonging to the photograph agency or the music agency. A network connection unit 30 is used to connect the personal computer 2 to the printer 3, which is a peripheral device to which print command data is transmitted via the network. Further, either the photograph display application program file 52 or the music reproduction program file 53, both of which are stored in the external storage device 51 of the printer 3, is referred to by the personal computer 2 via the network, and is downloaded into the external storage device 29 of the personal computer 2.

A program file group and a data file group are stored in the external storage device 29, and as was previously described, the program file group includes a program file for the file manager 31, a program file for the Internet browser 71, the photograph data/music data purchase instruction program file 72, the photograph display application program 52, and the music reproduction application program 53. The data file group also includes data files used for the various program files.

Figure 9:
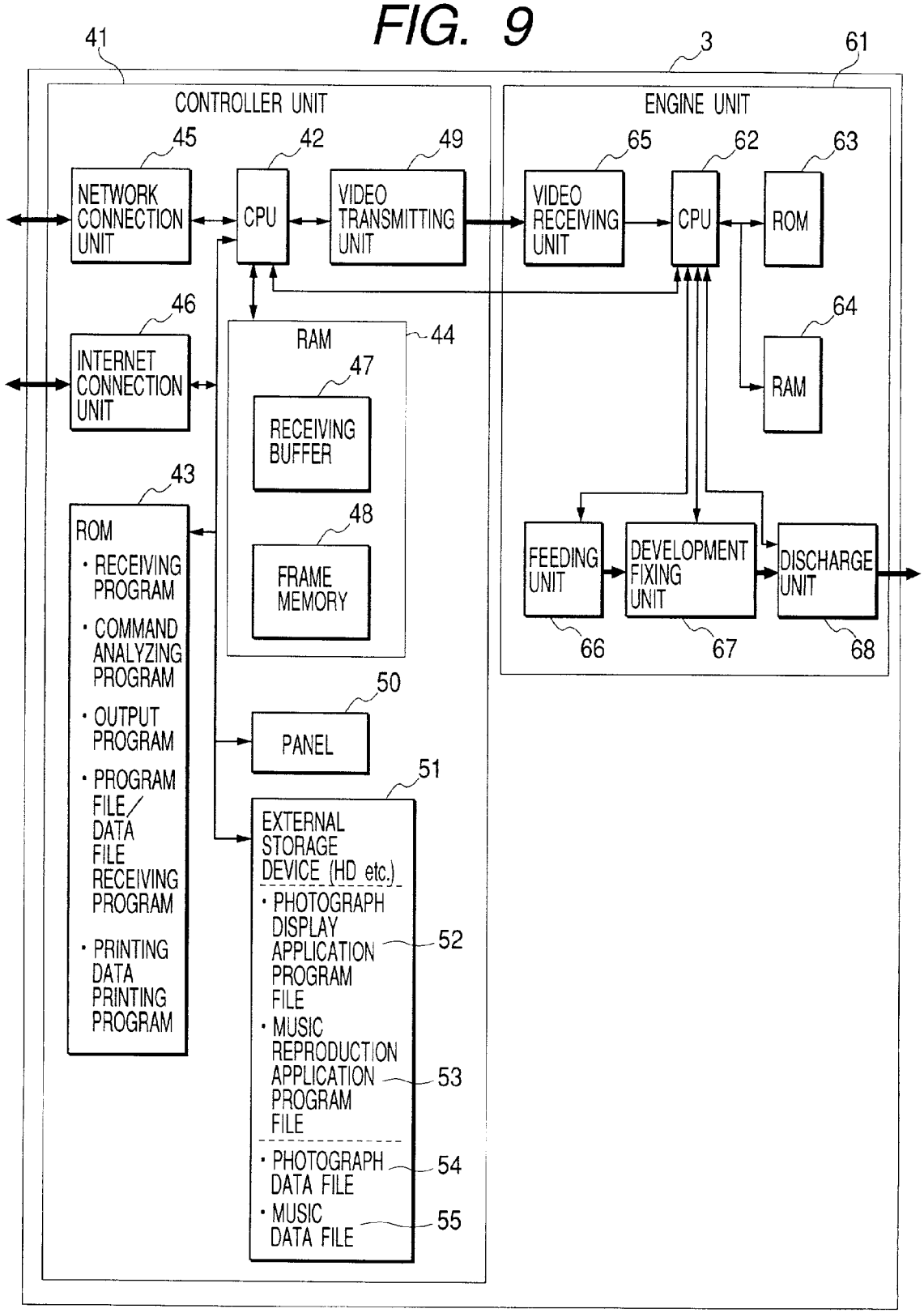
FIG. 9 is a block diagram showing the configuration of a printer.

FIG. 9 is a block diagram showing the configuration of the printer 3.

The printer 3 is mainly constituted by a controller 41 and an engine unit 61. The controller 41 generates a sheet image for each page based on print command data received from the user's personal computer 2, converts the image into a video signal, and transmits the video signal to the engine unit 61. Upon the receipt of the video signal, the engine unit 61 transfers the image to a sheet, fixes the image thereon, and discharges the sheet from the printer 3.

The controller 41 will now be described in detail. A central processing unit (hereinafter referred to as a CPU) 42 provides overall control for the controller 41, and in a read only memory (hereinafter referred to as a ROM) 43, various programs are stored that are used to control the functions performed by the controller 41. These programs are mainly a receiving program, a command analyzing program, an output program, a program file/data file receiving program and a photograph data printing program.

Via a network connection unit 45, the receiving program stores in a receiving buffer 47 in a random access memory (hereinafter referred to as a RAM) 44 print command data that are received from the user's personal computer 2. The command analyzing program analyzes a print command stored in the receiving buffer 47 and draws an image in a frame memory 48 in the RAM 44. Thereafter, the output program employs a video transmitting unit 49 to convert the image in the frame memory 48 into a video signal, which it then transmits to the engine unit 61.

While the explanation order is inverted, the RAM includes the receiving buffer 47, the frame memory 48, which is a sheet image memory area for one page, and a work area.

The work area is used by the receiving program, the command analyzing program, the output program, the program file/data file receiving program and the photograph data printing program.

The operation of the program file/data file receiving program will be described later in detail; however, the function of the photograph data printing program is the printing the photograph data 54 stored in the external storage device 51.

An Internet connection unit 46 is used to connect, via the Internet, the program file/data file receiving program to the web server 1, which belongs to an entity such as a photograph agency or a music agency.

A panel 50 is employed by a user to instruct the printing of photograph data that is stored in the external storage device 51. Specifically, the external storage device 51 is a hard disk (can be abbreviated as HD). The photograph display application program file 52, the music reproduction application program file 53, the photograph data file 54 and the music data file 55, which are received from the web server 1, belonging to an entity such as a photograph agency or a music agency, are stored in the external storage device 51. The photograph display application program file 52 and the music reproduction application program file 53 are visible to the file manager 31 of the user's personal computer 2, and can be copied to the personal computer 2, while the photograph data file 54 and the music data file 55 are not visible to and can not be copied by the personal computer 2.

The engine unit 61 will now be described. The engine unit 61 also comprises a CPU 62, a ROM 63, in which a control program for the engine unit 61 is stored, and a RAM 64, which is a work area for the program. A video receiving unit 65 receives a video signal from the controller 41, and a development fixing unit 67 transfers an image to a sheet. A feeding unit 66 feeds an unused blank sheet from a sheet cassette, the development fixing unit 67 transfers an image to the sheet and fixes the image thereon, and a discharge unit 68 discharges the printed sheet.

The thick arrows in FIG. 9 indicate the transmission of print command data or page image data, the transmission of a video signal, and the conveyance of a sheet through the engine unit 61. The narrow arrows indicate the transfer of control among parts. The CPU 42 of the controller 41 and the CPU 62 of the engine unit 61 also exchange data. The information to be exchanged is that required to control the timing of the printing process, such as the transfer of a video signal and the feeding of a sheet.

When an instruction to purchase photograph data or music data is received from the user's personal computer 2, first, this instruction is stored, as is normal print command data, in the receiving buffer 47 via the network connection unit 45. The command analyzing program then analyzes the received command, and when it is ascertained that the instruction is for the purchase of photograph data or music data, the program file/data file receiving program is activated to handle the following process. The operation of the program file/data file receiving program will be described in detail later, while referring to the flowchart in FIG. 13.

When the user has employed the user's personal computer 2 to issue a photograph data printing instruction, without using the panel 50, first, this instruction is stored, as is the normal print command data, in the receiving buffer 47 via the network connection unit 45. The command analyzing program then analyzes the received command, and when it is ascertained that the instruction is for the printing of photograph data, the photograph data printing program is instructed to perform the following printing process. The operation of the photograph data printing program will be described in detail later, while referring to the flowchart in FIG. 14.

The operation of the information processing system according to the second embodiment of the present invention will now be described while referring to the flowcharts.

Figure 10:
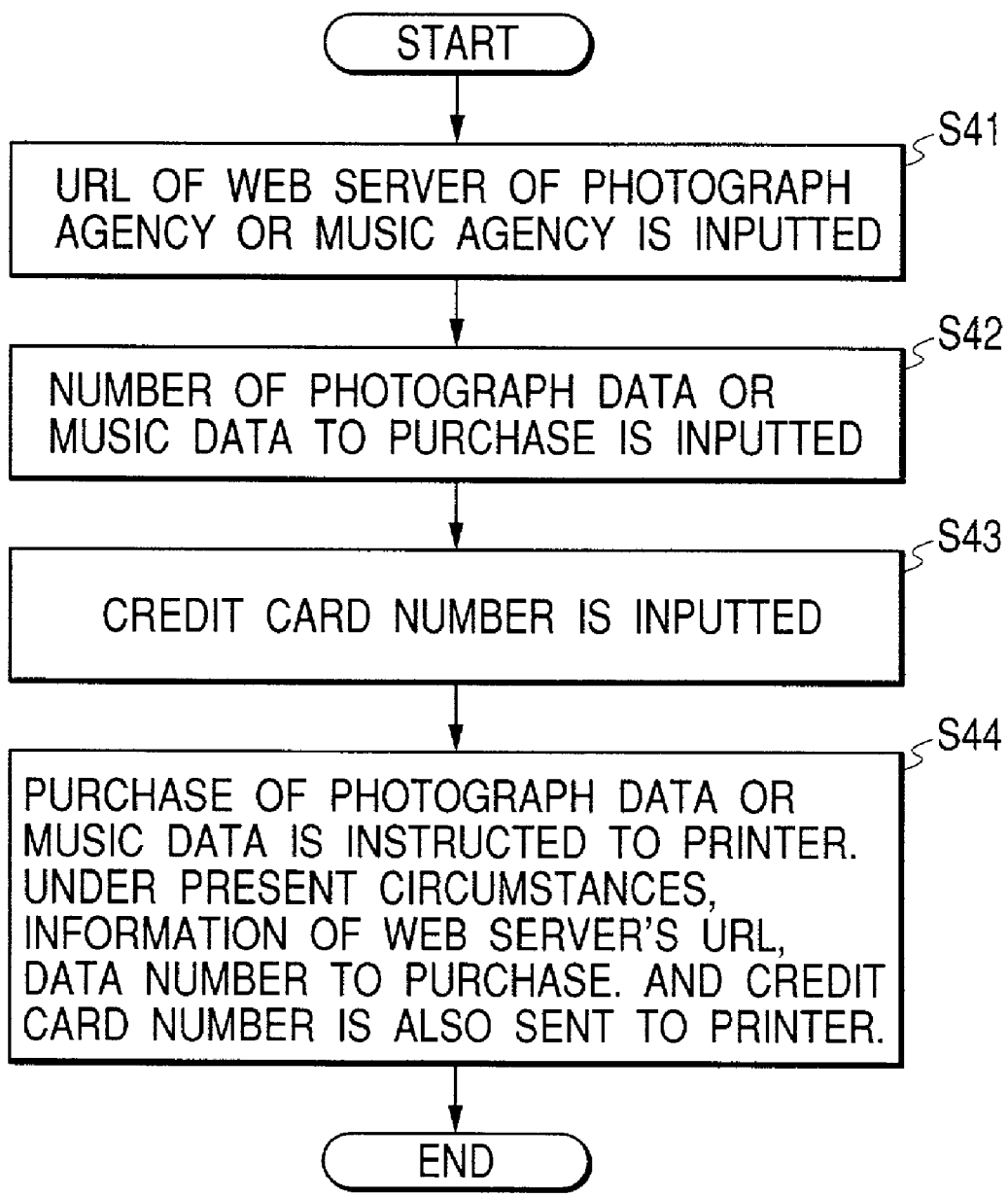
FIG. 10 is a flowchart for explaining the operation of a photograph data/music data purchase instruction program.

FIG. 10 is a flowchart for explaining the operation of the photograph data/music data purchase instruction program stored in the user's personal computer 2. This program is activated by a user to purchase photograph data or music data.

First, at step S41, the URL of the web server 1, belonging to a photograph agency or a music agency, i.e., a homepage address on the Internet, is entered, at step S42, the number provided for the photograph data or music data to be purchased is entered, at step S43, a credit card number is entered, and finally, at step S44, the printer 3 is instructed to purchase photograph data or music data.

At this time, the printer 3 also receives the URL of the web server 1, the number provided for the data to be purchased and the credit card number, all of which were entered at steps S41 through S43.

The operation of this program is thereafter terminated.

When this program is initiated, the Internet browser 71 of the user's personal computer 2 may be disconnected from the web server 1.

Figure 11:
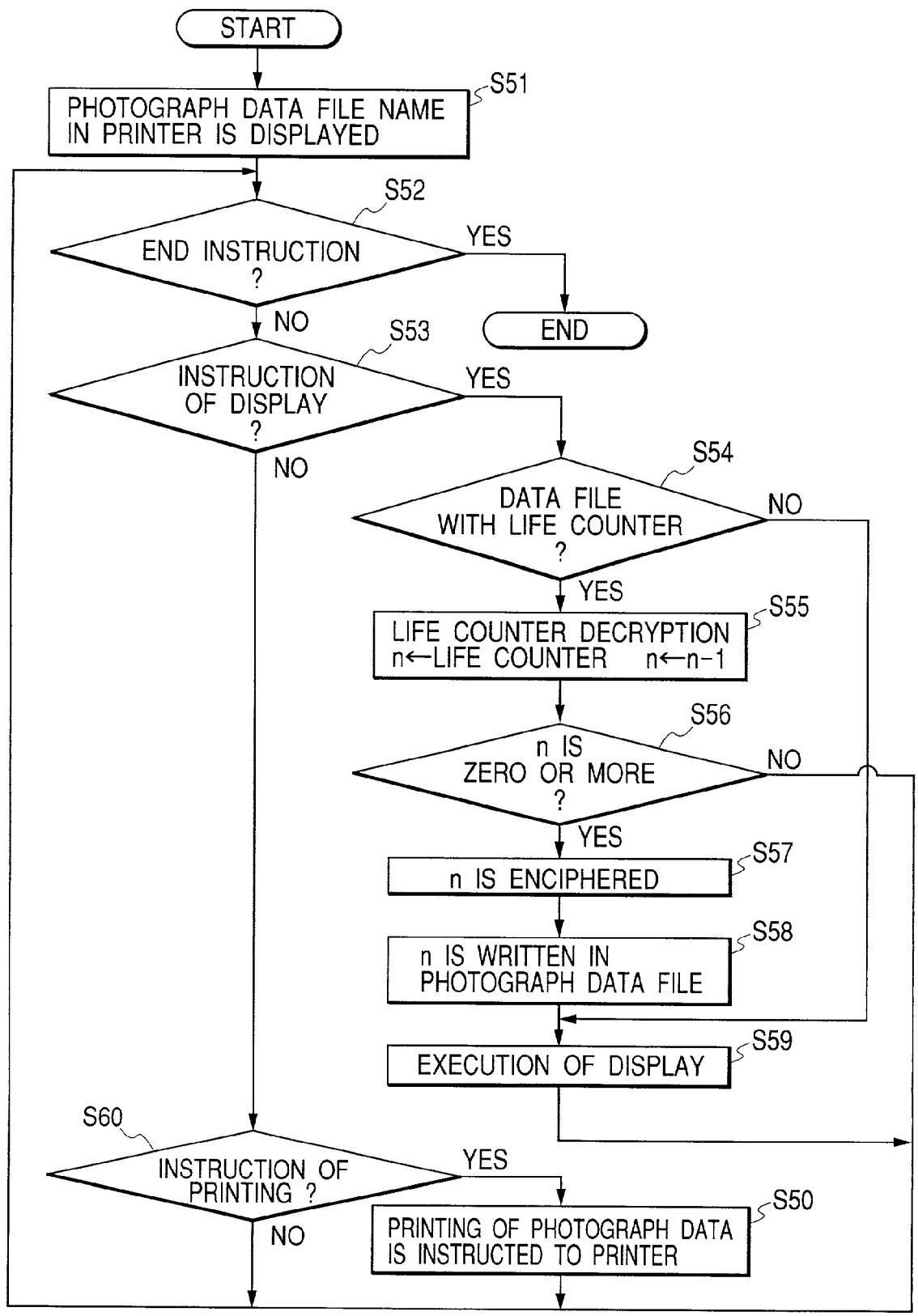
FIG. 11 is a flowchart for explaining the operation of a photograph display application.

FIG. 11 is a flowchart for explaining the processing performed by the photograph display application 52 of the user's personal computer 2. This program is activated upon the receipt of an instruction from a user.

First, at step S51 the list of the titles of photograph data files 54 stored in the external storage device 51 of the printer 3 is displayed, and at step S52, a check is performed to determine whether the user has issued an end instruction. If the decision is YES, the program is terminated. If the decision is NO, at step S53 a check is performed to determine whether the user has issued a photograph data file display instruction. If the decision is YES, at step S54 a check is performed to determine whether that data file is one that includes a life counter. When the decision is YES, at step S55, the encrypted life counter is decrypted, the value held by the life counter is used to set a variable n, and the variable n is decremented by one. Then, at step S56, a check is performed to determine whether the variable n is equal to or greater than 0. When the decision is NO, without performing any further processing, program control returns to a position immediately preceding step S52 and loops while waiting for the next instruction to be issued by the user.

When the decision at step S56 is YES, at step S57 the variable n is encrypted and at step S58 the encrypted variable n is written in the photograph data file, and at step S59 the resultant data in the photograph data file is used for a display.

When the decision at step S54 is NO, program control jumps to step S59 and a simple photograph data process is performed.

Following step S59, program control returns to a position immediately preceding step S52 and loops while waiting for the next instruction to be issued by the user.

When the decision at step S53 is NO, at step S60 a check is performed to determine whether the user has issued a photograph data printing instruction. If the decision is YES, at step S50 the printer 3 is instructed to print the data in the photograph data file selected by the user.

After step S50, or when the decision at step S60 is NO, program control returns to a position immediately preceding step S52 and loops while waiting for the next instruction to be issued by the user.

During this processing, the decrementing of the life counter has been performed before the display of the photograph data; however, the value of the life counter may be decremented after the photograph data has been normally displayed.

Figure 12:
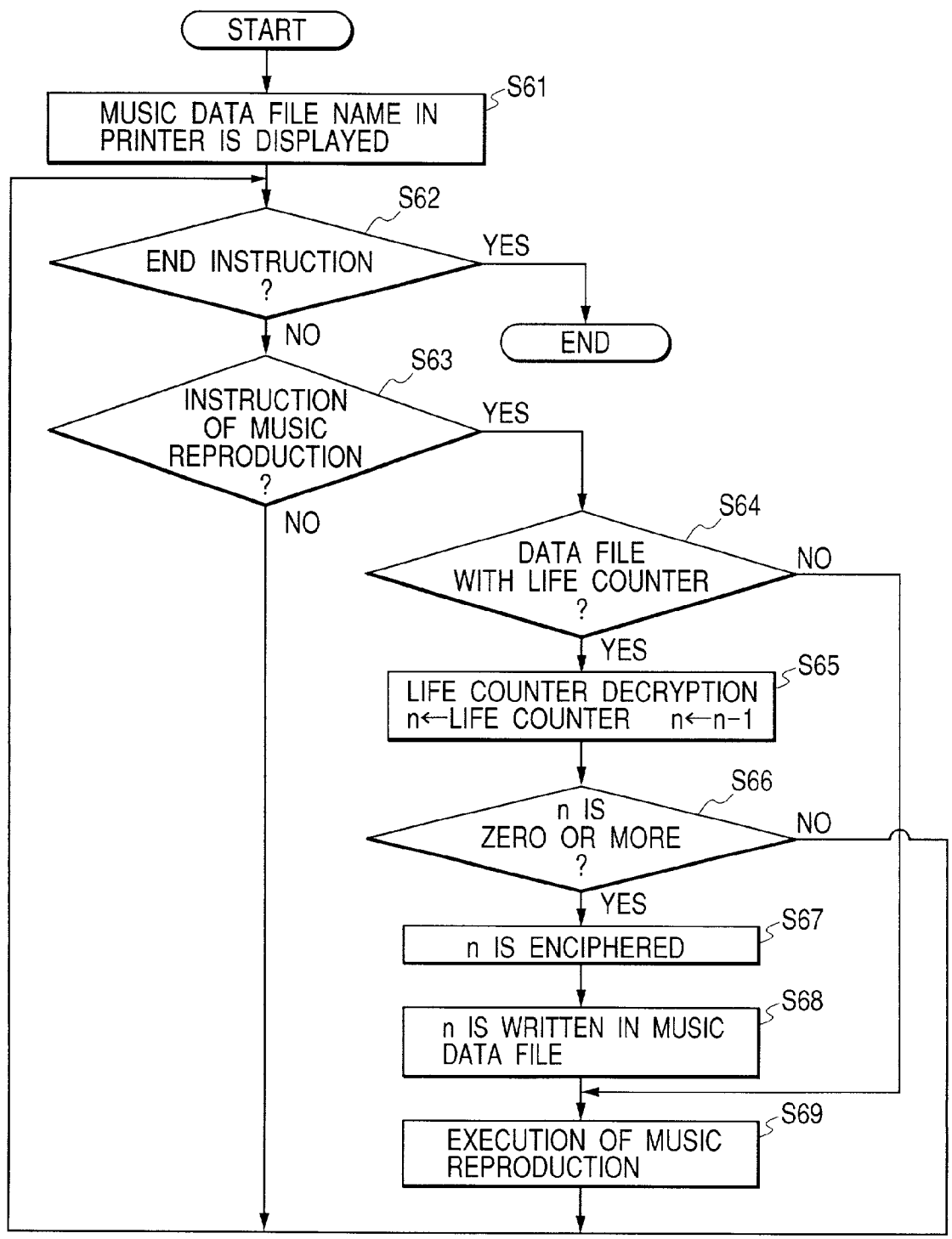
FIG. 12 is a flowchart for explaining the operation of a music reproduction application.

FIG. 12 is a flowchart for explaining the processing performed by the music reproduction application 53 of the user's personal computer 2. This program is activated upon the receipt of an instruction from a user.

First, at step S61 the list of the titles of music data files 55 stored in the external storage device 51 of the printer 3 is displayed, and at step S62, a check is performed to determine whether the user has issued an end instruction. If the decision is YES, the program is terminated. If the decision is NO, at step S63 a check is performed to determine whether the user has issued a music data file reproduction instruction. If the decision is YES, at step S64 a check is performed to determine whether that data file is one including a life counter. When the decision is YES, at step S65, the encrypted life counter is decrypted, the value of the life counter is used to set a variable n, and the variable n is decremented by one.

Then, at step S66, a check is performed to determine whether the variable n is equal to or greater than 0. When the decision is NO, without performing any further process, program control returns to a position immediately preceding step S62 and loops while waiting for the next instruction to be issued by the user. But when the decision at step S66 is YES, at step S67 the variable n is encrypted, and at step S68 the encrypted variable n is written in the music data file. At step S69, data in the resultant music data file is reproduced.

When the decision at step S64 is NO, program control jumps to step S69 and a simple music data reproduction process is performed.

Following step S69, or when the decision at step S63 is NO, program control returns to a position immediately preceding step S62 and loops while waiting for the next instruction to be issued by the user.

During this processing, the value held by the life counter is determined in correlation with the frequency of music reproduction; however, the value of the life counter may be determined in correlation with the music reproduction time. For example, if at the time of sale the initial value held by a music data file life counter is three hours, when as a result of repetitively reproducing the music the cumulative time used reaches three hours, further reproduction of the music is inhibited.

During this processing, the decrementing of the life counter has been performed before the reproduction of the music data; however, the value of the life counter may be decremented after the music data has been normally reproduced.

Figure 13:
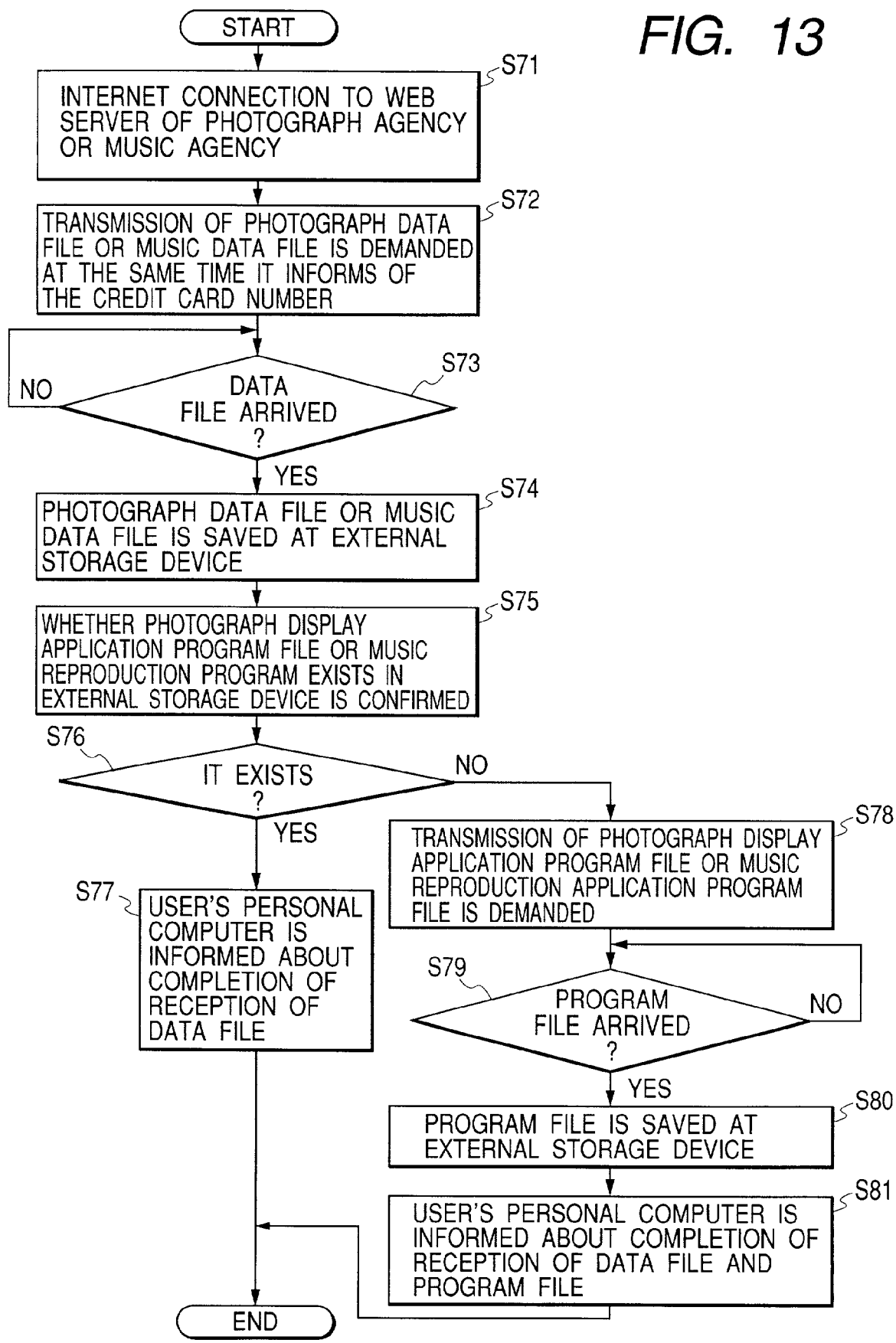
FIG. 13 is a flowchart for explaining the operation of a program file/data file reception program.

FIG. 13 is a flowchart for explaining the operation of the program file/data file receiving program of the printer 3. This program is activated by a command analyzing program when the printer 3 receives, from the user's personal computer 2, an instruction for the purchase of photograph data or music data.

First, at step S71, the printer 3 is connected via the Internet to the web server 1, which is owned by a photograph agency or a music agency, and at step S72, the printer 3 notifies the web server 1 of the credit card number of the user and requests that the web server 1 transmit a photograph data file 54 or a music data file 55.

At step S73, the program loops while waiting for a photograph data file 54 or a music data file 55 to arrive. When the photograph data file 54 or the music data file 55 is received, at step S74, that data file is stored in the external storage device 51. Since the life counter is received at the same time, the life counter is encrypted and the encrypted life counter is written in the data file 54 or 55.

At step S75, the external storage device 51 is examined to find the photograph display application program file 52, or the music reproduction application program file 53. When, at step S76, the search result is YES, at step S77 the user's personal computer 2 is notified that the reception of the data file 54 or 55 has been completed, and the processing of this program is terminated.

When the decision at step S76 is NO, i.e., when the photograph display application program file 52 or the music reproduction application program file 53 is not present, at step S78 the web server 1 is requested to transmit the pertinent program file. At step S79 the program loops while waiting for the program file 52 or 53 to arrive. When the program file 52 or 53 is received, at step S80 the received program file is stored in the external storage device 51. Then, at step S81, the user's personal computer 2 is notified of the receipt of the data file 54 or 55 and the program file 52 or 53, and the processing of the program is terminated.

When the transmission of the photograph data file 54 is requested at step S72, at step S78 the transmission of the photograph display application program file 52 is requested. Whereas if the transmission of the music data file 55 is requested at step S72, at step S78 the transmission of the music reproduction application program file 53 is requested.

Figure 14:
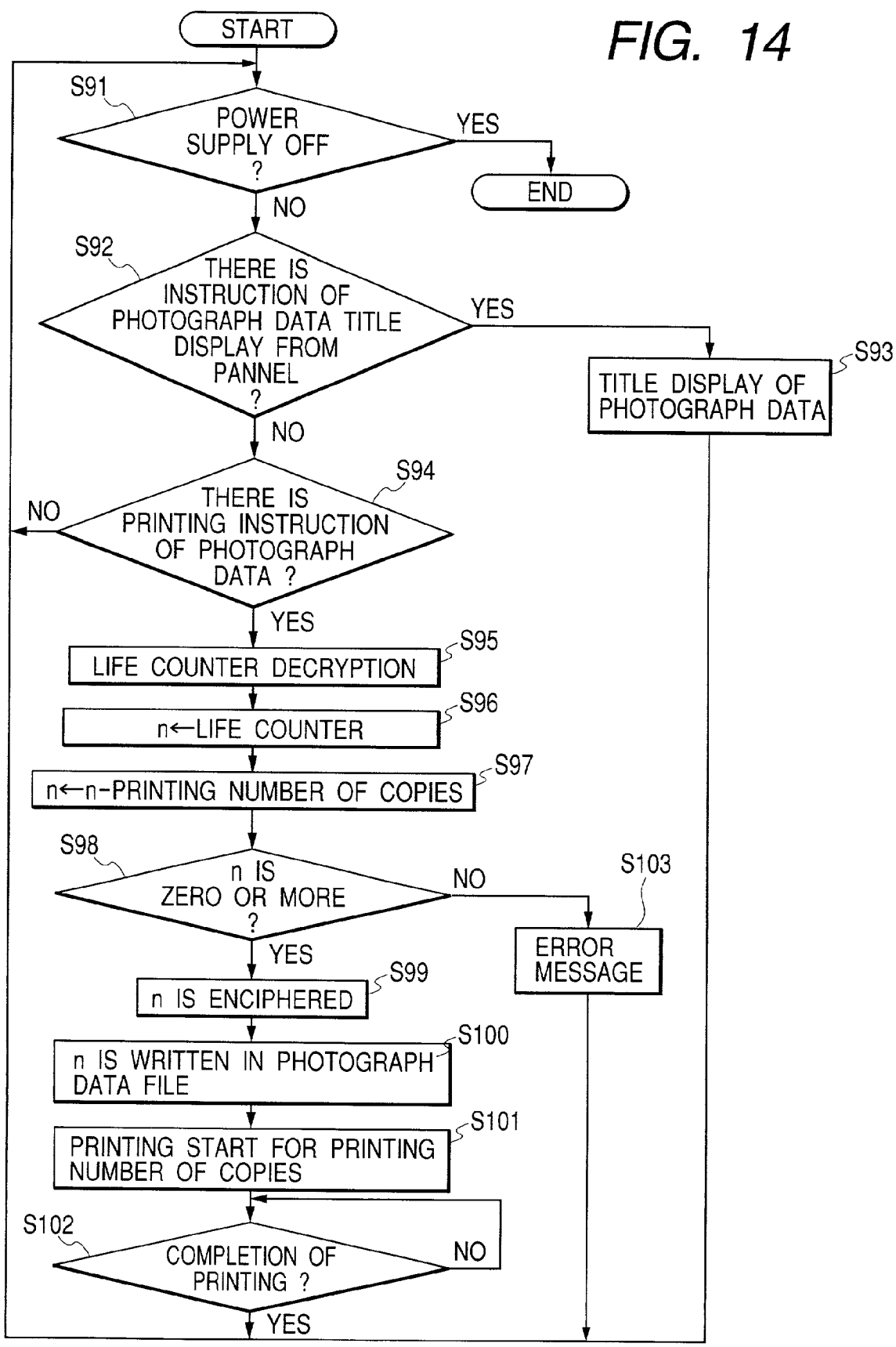
FIG. 14 is a flowchart for explaining the operation of a photograph data printing program.

FIG. 14 is a flowchart for explaining the operation of the photograph data printing program of the printer 3. This program is activated at the same time as the printer 3 is powered on.

First, at step S91 a check is performed to determine whether the user powered off the printer 3. If the decision is YES, the processing is terminated.

When the decision is NO, at step S92 a check is performed to determine whether the user has issued an instruction at the panel 50 to display the titles of photograph data files 54 that are stored in the external storage device 51. When the decision is YES, at step S93 a list of the titles of photograph data files 54 is displayed on the panel 50. Thereafter, program control returns to a position immediately preceding step S91 and loops while waiting for the next instruction to be issued by the user.

When the decision at step S92 is NO, at step S94 a check is performed to determine whether the user has issued an instruction to print the data for the photograph data file 54. The printing instruction may be issued by using the panel 50 of the printer 3, or by using the photograph display application 52 that is currently being operated by the user's personal computer 2.

If the decision at step S94 is NO, program control returns to a position immediately preceding step S91 and loops while waiting for the next instruction to be issued by the user.

When the decision at step S94 is YES, at step S95, the encrypted life counter, which is written in the photograph data file 54, is decrypted, at step S96 the value of the life counter is used to set a variable n, and at step S97, the variable n is decremented by a value equivalent to the number of copies instructed by the user.

Then, at step S98 a check is performed to determine whether the variable n is equal to or greater than 0. If the decision is NO, at step S103 an error message is displayed, and then, without performing any further process, program control returns to a position immediately preceding step S91 and loops while waiting for the next instruction to be issued by the user.

When the decision at step S97 is YES, at step S99 the variable n is encrypted, at step S100 the encrypted variable n is written in the photograph data file 54, and at step S101 the printing of the number of photograph data file 54 copies instructed is initiated. Then, at step S102 program control loops while waiting for the printing to be completed. When the printing has been completed, program control returns to a position immediately preceding step S91 and loops while waiting for the next instruction to be issued by the user.

<Effects in the Second Embodiment>

In the second embodiment, the printer receives content data, such as photograph data or music data, via the Internet, and stores the data in the external storage device of the printer. Thus, a user can not directly read and copy the data using the file manager. That is, since the content data is stored only in the external storage device of the printer, unauthorized copying is prevented.

Only a special photograph display application or music reproduction application can read the photograph data or music data stored in the external storage device of the printer and can display a photograph or reproduce music. Also, with this arrangement the probability that unauthorized copies will be made by users is reduced.

The photograph display application can also instruct the printing of photograph data. Further, during the printing process, as during the display process, the value held by the life counter is decremented by one each time printing is performed. That is, since the value held by the life counter is decremented regardless of whether the photograph data is displayed or printed, a photograph agency can set a low price for photograph data, while taking printing into account.

In this embodiment, the printer receives, via the Internet, the photograph display application program file or the music reproduction application program file together with a photograph data file or a music data file. Therefore, the labor required of a user when acquiring a program file, by having to engage in a separate operation on the Internet, can be eliminated.

<Third Embodiment>

In the second embodiment, when the printer receives photograph data or music data from a web server, belonging to a photograph agency or a music agency, to which it is connected, the received data file is stored unchanged in the external storage device.

In a third embodiment, before photograph data or music data are stored in the external storage device of the printer they are encrypted. With this arrangement, the theft of photograph data or music data from the printer can be prevented.

It should be noted that before a photograph data application displays photograph data or a music reproduction application reproduces music data, a decrypting process is performed for the encrypted photograph data or music data.

<Fourth Embodiment>

In the second embodiment, the printer having the Internet connection function is employed as a peripheral device connected to the user's personal computer. In a fourth embodiment, instead of a printer, a LAN server or another network device having an Internet connection function or, more broadly, a communication device may be employed. For this purpose, a handy telephone is considered to be a communication device.

Actually, any device can be employed so long as it has a function for preventing a third party from performing the unauthorized copying of digital content data, such as photograph data or music data, that are received and stored.

The above embodiments will now be summarized. In the first embodiment, first, a life counter is added to a digital data file, such as a photograph data file or a music data file, that is to be distributed to the user. This life counter is correlated with the frequency of the display of photograph data or the reproduction of music data. And each time a photograph display application or a music reproduction application in a user's personal computer displays photograph data or reproduces music data, a value held by the life counter is decremented a specific amount.

When the value held by the life counter has been reduced to a value smaller than a predetermined value, the display of photograph data or the reproduction of music data is inhibited.

Further, when the file manager of a user's personal computer is to copy a digital data file, such as a photograph data file or a music data file, the life counters of the source file that is copied and the destination file are each reduced by half, so that the total value held by the life counters is unchanged. Therefore, even when a copy operation is performed, the total number of times photograph data can be displayed, or the total number of times music data can be reproduced is unchanged.

Furthermore, since the life counter is encrypted and the encrypted life counter is embedded in the data in a digital data file, such as a photograph data file or a music data file, the user can not alter the file and increase the value held by the life counter.

In the above explanation, the life counter is determined in correlation with the display frequency or the reproduction frequency; however, when the digital content data is music or video data, the value held by the life counter may be determined in correlation with the music reproduction time or the video reproduction time.

Assume that the value held by the life counter of a digital data file is decremented by the value equivalent to the time the data were reproduced by the user's personal computer, and that, if the value held by the life counter is reduced to 0, data reproduction is inhibited.

In this case, when a file is copied, the values held by the life counters of the source file that is copied and the destination file are reduced to half a value, as is described above.

In the thus arranged first embodiment, since a life counter is added to digital content data, such as photograph data or music data, the frequency of the display or reproduction can be limited. Further, since the value held by a life counter is equally divided during a copy operation while a frequency of display or reproduction limit is maintained, the digital content data, such as photograph data or music data, can be sold at a lower price via the Internet.

In the first embodiment, the decrementing function performed for the life counter is provided for the photograph display application and the music reproduction application in the user's personal computer. Further, the file manager of the user's personal computer is in charge of the file copying operation, and decrements the value held by the life counter during a copying operation.

However, the file manager belongs to the operating system (hereinafter referred to as the OS) of the personal computer, and is not a program that is easily supplied by a maker other than the software maker of the pertinent OS. Further, if a user creates a program tool that will simply copying any file, a digital data file can be directly copied without the value held by a life counter being decremented. Thus, security is not easily provided for the arrangement of the first embodiment.

Thus, in the second embodiment, a peripheral device, such as a color printer, that is attached to the user's personal computer and that has an Internet connection function is connected via the Internet to the web server of a photograph agency or a music agency, and receives and encrypts digital content files, such as photograph data files or music data files, and stores the encrypted data in an external storage device, such as a hard disk attached to the color printer.

At the same time, the color printer receives a life counter, and adds the encrypted life counter to a digital file on its attached hard disk.

A photograph display application or a music reproduction application is also received via the Internet from the web server of the photograph agency or the music agency, and is stored in the external storage device of the color printer.

By the way, the user's personal computer and color printer are connected via the network, and so on. The user's personal computer sends to the color printer an instruction to instruct which digital content data is received and stored. After storing the data file by the color printer, the user's personal computer copies an application program file, such as display application of photograph data or music reproduction application from the hard disc of the color printer. The external storage device of the user's personal computer stores the application program file.

The application program file, the photograph display application or music reproduction application, is stored in the external storage device of the color printer in a form that is visible from outside the printer and can be read, i.e., can be copied. However, the form of the digital data file is such that it is not visible outside of the color printer, i.e., the data file can not be copied.

When the photograph display application or the music reproduction application is activated in the user's personal computer, the photograph data file or music data file held by the color printer can be viewed by scanning the menu supplied by the application, and the display or reproduction of data can be performed. However, the photograph display application or the music reproduction application has only a display or a function, and does not have a save function, such as a "save as" function, so that simple copying is difficult. It should be noted, however, that the display application may include a printing function.

The second embodiment, therefore, differs from the first embodiment in that a special function is not required for the file manager, which is a part of the OS of the user's personal computer.

In the above description, the photograph display application program file or the music reproduction application program file is received from the web server of the photograph agency or the music agency. However, before a color printer is shipped, a printer maker may store the program file on the hard disk of the color printer. In this case, the photograph display application or the music reproduction application program should be prepared, by a detailed data format specification being established between the photograph agency or the music agency and the printer maker.

In the second embodiment, with the above described arrangement, a peripheral device, such as a color printer, that is attached to the user's personal computer is connected via the Internet to the web server, of the photograph agency or the music agency, receives digital data to which it adds a life counter, and stores the data in an external storage device. These digital data files are visible only to a photograph display application or a music reproduction application that has been specially prepared, and a copy process can not be used to extract them from the color printer.

Therefore, in the second embodiment, a more practical copy inhibiting form is provided than is available with the first embodiment, and the data display or reproduction frequency is restricted by adding a life counter to digital content data, such as photograph data or music data. Thus, the digital content data can be offered for sale at a lower price via the Internet.

In the second embodiment, a color printer having an Internet connection function is employed as a peripheral device connected to a user's personal computer. But instead of a color printer, a LAN server or other network device may be employed so long as it has an Internet connection function.

The scope of the invention also includes a mode whereby software program code for implementing the functions of the embodiments is supplied to a system or an apparatus (or a CPU or a MPU), and is operated in accordance with a program stored in the system or the apparatus.

In this case, the software program code implements the functions of the embodiments, and the program code itself, and means for supplying the program code to a computer, e.g., a storage medium on which the program code is stored, constitute the present invention. The storage medium used for supplying such program code can be, for example, a floppy disk, a hard disk, an optical disk, a magneto-optical disk, a CD-ROM, a magnetic tape, a nonvolatile memory card, or a ROM.

The above embodiments are merely examples employed to explain the implementation of the present invention, and it should be understood that the technical scope of the invention is not limited to the embodiments described herein. That is, the present invention can employed for various applications, without departing from or compromising the spirit or the main feature of the invention.

As is described above, according to the present invention, the frequency of data display or data reproduction can be limited by adding a life counter to content data, such as photograph data or music data. And further, during a copy process, limits imposed on display, printing and reproduction frequencies can be maintained by equally dividing the value held by the life counter. As a result, the content data, comprising photograph data and or music data, can be sold at a lower price via the Internet.

What is claimed is:

1. An information processing apparatus comprising:
   encryption means, for encrypting a life counter for content data;
   addition means, for adding said encrypted life counter to a content data file; and
   transmission means, for externally transmitting, via a network, said content data file having said added life counter,
   wherein, when the content data file is copied to a destination file, a value held by the life counter of the content data file being copied is reduced by one half and the reduced value is copied to a life counter of the destination file.

2. An information processing apparatus according to claim 1, wherein said transmission means externally transmits said content data file via the Internet.

3. An information processing apparatus comprising:
   reception means, for externally receiving, via a network, a content data file to which an encrypted life counter has been added;
   processing means, for processing said content data file;
   subtraction means, for subtracting a specific value from said encrypted life counter; and
   control means, for inhibiting said processing means from processing said content data file when the value held by said encrypted life counter has been reduced to a value smaller than said specific value,
   wherein, when the content data file is copied to a destination file, a value held by the life counter of the content data file being copied is reduced by one half and the reduced value is copied to a life counter of the destination file.

4. An information processing apparatus according to claim 3, wherein said reception means externally receives said content data file via the Internet.

5. An information processing apparatus according to claim 4, wherein said processing means displays, prints or reproduces data in said content data file.

6. An information processing system whereby a first information processing apparatus and a second information processing apparatus are interconnected, wherein said first information apparatus comprises:
   encryption means, for encrypting a life counter for content data,
   addition means, for adding said encrypted life counter to a content data file, and
   transmission means, for transmitting, via a network, said content data file having said added life counter to said second information apparatus; and
   wherein said second information processing apparatus comprises:
   reception means, for receiving, via a network, from said first information processing apparatus a content data file to which an encrypted life counter has been added,
   processing means, for processing said content data file,
   subtraction means, for subtracting a specific value from said encrypted life counter; and
   control means, for inhibiting said processing means from processing said content data file when the value held by said encrypted life counter has been reduced to a number smaller than said specific value,
   wherein, when the content data file is copied to a destination file, a value held by the life counter of the content data file being copied is reduced by one half and the reduced value is copied to a life counter of the destination file.

7. An information processing system according to claim 6, wherein said transmission means or said reception means externally transmits or receives said content data file via the Internet.

8. An information processing system according to claim 7, wherein said processing means displays, prints or reproduces data in said content data file.

9. An information processing system according to claim 8, wherein said second information processing apparatus further comprises:
   copying means, for copying said content data file including said encrypted life counter; and
   counter control means, for reducing, to half a value, the value held by life counters of a source file that is copied and a destination file when copying said content data file.

10. An information processing system according to claim 8, wherein said second information processing apparatus further comprises:
    moving means, for moving said content data file without changing the value held by said encrypted life counter.

11. An information processing system according to claim 8, wherein said first information processing apparatus further comprises:
    determination means, for determining the value to be held by said life counter in correlation with the frequency of the display, printing or reproduction of said content data.

12. An information processing system according to claim 8, wherein said first information processing apparatus further comprises:
    determination means, for determining the value to be held by said life counter in correlation with a content data reproduction time, and wherein said subtraction means of said second information processing apparatus decrements the value held by said encrypted life counter by a value correlated with a period of time during which said content data is reproduced.

13. An information processing apparatus comprising:
    data transmission means, for externally transmitting, via a network, a content data file;
    life counter transmission means, for externally transmitting, via said network, a life counter for said content data file;
    program transmission means, for externally transmitting, via said network, an application program file for processing said content data file,
    wherein the application program file includes processing instructions such that, when the content data file is copied to a destination file, the specific value is one half the value held by the encrypted life counter and wherein the reduced value is copied to a life counter of the destination file.

14. An information processing apparatus according to claim 13, wherein said data transmission means, said life counter transmission means and said program transmission means externally transmit said content data file via the Internet.

15. An information processing apparatus according to claim 14, wherein said application program file is used to display, print or reproduce data in said content data file.

16. An information processing apparatus comprising:
    data reception means, for receiving, via a network, a content data file;
    life counter reception means, for receiving, via said network, a life counter for said content data file;

program reception means, for receiving, via said network, an application program file for processing said content data file;

encryption means, for encrypting said life counter;

addition means, for adding said encrypted life counter to said content data file;

transmission means, for transmitting, via said network, said application program file to a different information processing apparatus; and control means, for permitting the reading only of the content data file for an application program that is currently being executed by said different information processing apparatus, wherein, when the content data file is copied to a destination file, a value held by the life counter of the content data file being copied is reduced by one half and the reduced value is copied to a life counter of the destination file.

17. An information processing apparatus according to claim 16, wherein said data reception means, said life counter reception means and said program reception means externally receive said content data file via the Internet.

18. An information processing apparatus according to claim 17, wherein said application program file is used to display, print or reproduce data in said content data file.

19. An information processing apparatus comprising:

reception means, for receiving, via a network, an application program file for processing content data from a different information processing apparatus;

processing means, for executing, via said network, said application program for processing content data stored in said different information processing apparatus;

subtraction means, for subtracting, via said network, a specific value from a life counter for said content data stored in said different information processing apparatus each time said content data file is processed;

control means, for inhibiting said processing means from processing content data when the value held by said encrypted life counter has been reduced to a value smaller than said specific value, wherein, when the content data file is copied to a destination file, a value held by the life counter of the content data file being copied is reduced by one half and the reduced value is copied to a life counter of the destination file.

20. An information processing apparatus according to claim 19, wherein, via said network, said processing means displays, prints or reproduces data in said content data file.

21. An information processing system whereby a first information processing apparatus, a second information processing apparatus and a third information processing apparatus are interconnected, wherein said first information processing apparatus comprises:

data transmission means, for transmitting, via a network, a content data file to said second information processing apparatus, life counter transmission means, for transmitting, via said network, a life counter for said content data file to said second information processing apparatus, and program transmission means, for transmitting, via said network, an application program file for processing said content data file to said second information processing apparatus;

wherein said second information processing apparatus comprises:

data reception means, for receiving, via said network, said content data file from said first information apparatus, life counter reception means, for receiving, via said network, a life counter for said content data file from said first information processing apparatus, program reception means, for receiving, via said network, an application program file for processing said content data file from said first information processing apparatus, encryption means, for encrypting said life counter, addition means, for adding said encrypted life counter to said content data file, transmission means, for transmitting, via said network, said application program file to said third information processing apparatus, and control means for permitting the reading of the content data file only for an application program that is currently being executed by said third information processing apparatus; and wherein said third information processing apparatus comprises:

reception means, for receiving, via said network, an application program file for processing content data received from said second information processing apparatus, processing means, for executing, via said network, said application program for processing content data stored in said second information processing apparatus;

subtraction means, for subtracting, via said network, a specific value from a life counter for said content data stored in said different information processing apparatus each time said content data file is processed, control means, for inhibiting said processing means from processing content data when the value held by said encrypted life counter has been reduced a value smaller than said specific value, wherein, when the content data file is copied to a destination file, a value held by the life counter of the content data file being copied is reduced by one half and the reduced value is copied to a life counter of the destination file.

22. An information processing system according to claim 21, wherein said data transmission means, said life counter transmission means and said program transmission means, or said data reception means, said life counter reception means and said program reception means externally transmit or receive said content data file via the Internet.

23. An information processing system according to claim 22, wherein said processing means displays, prints or reproduces data in said content data file.

24. An information processing system according to claim 23, wherein said processing means inhibits the copying of said content data having said encrypted life counter stored in said second information processing apparatus, even if said application program is executed.

25. An information processing system according to claim 23, wherein said processing means inhibits the moving of said content data having said encrypted life counter stored in said second information processing apparatus, even if said application program is executed.

26. An information processing system according to claim 23, wherein said first information processing apparatus further comprises:

determination means, for determining the value to be held by said life counter in correlation with the frequency of the display, printing or reproduction of said content data.

27. An information processing system according to claim 23, wherein said first information processing apparatus further comprises:
  determination means, for determining the value to be held by said life counter in correlation with a content data reproduction time, and wherein said subtraction means decrements the value held by said encrypted life counter by a value correlated with a period of time during which said content data is reproduced.

28. An information processing system according to claim 23, wherein said second information processing apparatus further comprises:
  printing means, for printing content data on a sheet.

29. An information processing system according to claim 23, wherein said data reception means of said second information processing apparatus receives a content data file via the Internet, encrypts said content data file, and stores the encrypted content data file; and wherein said processing means of said third information processing apparatus decrypts said encrypted content data file, and displays, prints or reproduces the decrypted content data file.

30. An information processing system according to claim 23, wherein said second information processing apparatus is a peripheral device having an Internet connection function.

31. An information processing system according to claim 23, wherein said second information processing apparatus is a LAN server having an Internet connection function.

32. An information processing system according to claim 23, wherein said second information processing apparatus is a network connection device having an Internet connection function.

33. An information processing method comprising the steps of:
  (a) encrypting a life counter for content data;
  (b) adding said encrypted life counter to a content data file;
  (c) for externally transmitting, via a network, said content data file having said added life counter; and
  (d) when the content data file is copied to a destination file, reducing a value held by the life counter of the content data file being copied by one half and copying the reduced value to a life counter of the destination file.

34. An information processing method comprising the steps of:
  (a) externally receiving, via a network, a content data file to which an encrypted life counter has been added;
  (b) processing said content data file;
  (c) subtracting a specific value from said encrypted life counter;
  (d) inhibiting said step (b) for processing said content data file when the value held by said encrypted life counter has been reduced to a value smaller than said specific value; and
  (e) when the content data file is copied to a destination file, reducing a value held by the life counter of the content data file being copied by one half and copying the reduced value to a life counter of the destination file.

35. An information processing method comprising the steps of:
  (a) externally transmitting, via a network, a content data file;
  (b) externally transmitting, via said network, a life counter for said content data file; and
  (c) externally transmitting, via said network, an application program file for processing said content data file, wherein the application program contains instructions such that, when the content data file is copied to a destination file, a value held by the life counter of the content data file being copied is reduced by one half and the reduced value is copied to a life counter of the destination file.

36. An information processing method comprising the steps of:
  (a) receiving, via a network, a content data file;
  (b) receiving, via said network, a life counter for said content data file;
  (c) receiving, via said network, an application program file for processing said content data file;
  (d) encrypting said life counter;
  (e) adding said encrypted life counter to said content data file;
  (f) transmitting, via said network, said application program file to a different information processing apparatus;
  (g) permitting the reading only of the content data file for an application program that is currently being executed by said different information processing apparatus; and
  (h) when the content data file is copied to a destination file, reducing a value held by the life counter of the content data file being copied by one half and copying the reduced value to a life counter of the destination file.

37. An information processing method comprising the steps of:
  (a) receiving, via a network, an application program file for processing content data from a different information processing apparatus;
  (b) executing, via said network, said application program for processing content data stored in said different information processing apparatus;
  (c) subtracting, via said network, a specific value from a life counter for said content data stored in said different information processing apparatus each time said content data file is processed;
  (d) inhibiting said step (b) for processing content data when the value held by said encrypted life counter has been reduced to a value smaller than said specific value; and
  (e) when the content data file is copied to a destination file, reducing a value held by the life counter of the content data file being copied by one half and copying the reduced value to a life counter of the destination file.

38. A computer-readable storage medium on which a program is stored that permits a computer to perform:
  (a) a process for encrypting a life counter for content data;
  (b) a process for adding said encrypted life counter to a content data file;
  (c) a process for externally transmitting, via a network, said content data file having said added life counter; and
  (d) a process for, when the content data file is copied to a destination file, reducing a value held by the life counter of the content data file being copied by one half and copying the reduced value to a life counter of the destination file.

39. A computer-readable storage medium on which a program is stored that permits a computer to perform:
  (a) a process for externally receiving, via a network, a content data file to which an encrypted life counter has been added;
  (b) a process for processing said content data file;

(c) a process subtracting a specific value from said encrypted life counter;

(d) a process for inhibiting said step (b) for processing said content data file when the value held by said encrypted life counter has been reduced to a value smaller than said specific value; and (e) a process for, when the content data file is copied to a destination file, reducing a value held by the life counter of the content data file being copied by one half and copying the reduced value to a life counter of the destination file.

40. A computer-readable storage medium on which a program is stored that permits a computer to perform:

(a) a process for externally transmitting, via a network, a content data file;

(b) a process for externally transmitting, via said network, a life counter for said content data file; and (c) a process for externally transmitting, via said network, an application program file for processing said content data file, wherein the application program contains instructions such that, when the content data file is copied to a destination file, a value held by the life counter of the content data file being copied is reduced by one half and the reduced value is copied to a life counter of the destination file.

41. A computer-readable storage medium on which a program is stored that permits a computer to perform:

(a) a process for receiving, via a network, a content data file;

(b) a process for receiving, via said network, a life counter for said content data file;

(c) a process for receiving, via said network, an application program file for processing said content data file;

(d) a process for encrypting said life counter;

(e) adding said encrypted life counter to said content data file;

(f) a process for transmitting, via said network, said application program file to a different information processing apparatus;

(g) a process for permitting the reading only of the content data file for an application program that is currently being executed by said different information processing apparatus; and (h) a process for, when the content data file is copied to a destination file, reducing a value held by the life counter of the content data file being copied by one half and copying the reduced value to a life counter of the destination file.

42. A computer-readable storage medium on which a program is stored that permits a computer to perform:

(a) a process for receiving, via a network, an application program file for processing content data from a different information processing apparatus;

(b) a process for executing, via said network, said application program for processing content data stored in said different information processing apparatus;

(c) a process for subtracting, via said network, a specific value from a life counter for said content data stored in said different information processing apparatus each time said content data file is processed;

(d) a process for inhibiting said step (b) for processing content data when the value held by said encrypted life counter has been reduced to a value smaller than said specific value; and (e) a process for, when the content data file is copied to a destination file, reducing a value held by the life counter of the content data file being copied by one half and copying the reduced value to a life counter of the destination file.

43. An information processing apparatus comprising:

encryption means, for encrypting a life counter for content data; and addition means, for adding said encrypted life counter to a content data file, wherein, when the content data file is copied to a destination file, a value held by the life counter of the content data file being copied is reduced by one half and the reduced value is copied to a life counter of the destination file.

44. An information processing method comprising the steps of:

encrypting a life counter for content data; and adding said encrypted life counter to a content data file, wherein, when the content data file is copied to a destination file, a value held by the life counter of the content data file being copied is reduced by one half and the reduced value is copied to a life counter of the destination file.

45. A storage medium which stored a program, said program comprising the steps of:

encrypting a life counter for content data; and adding said encrypted life counter to a content data file, wherein, when the content data file is copied to a destination file, a value held by the life counter of the content data file being copied is reduced by one half and the reduced value is copied to a life counter of the destination file.

46. An information processing apparatus comprising:

input means, for externally inputting a content data file to which an encrypted life counter has been added;

processing means, for processing said content data file;

subtraction means, for subtracting a specific value from said encrypted life counter each time said content data file is processed; and control means, for inhibiting said processing means from processing said content data file when the value held by said encrypted life counter has been reduced to a value smaller than said specific value, wherein, when the content data file is copied to a destination file, a value held by the life counter of the content data file being copied is reduced by one half and the reduced value is copied to a life counter of the destination file.

47. An information processing method comprising the steps of:

externally inputting a content data file to which an encrypted life counter has been added;

processing said content data file;

subtracting a specific value from said encrypted life counter each time said content data file is processed; and inhibiting said processing means from processing said content data file when the value held by said encrypted life counter has been reduced to a value smaller than said specific value, wherein, when the content data file is copied to a destination file, a value held by the life counter of the content data file being copied is reduced by one half and the reduced value is copied to a life counter of the destination file.

48. A storage medium which stored a program, said program comprising the steps of:
- externally inputting a content data file to which an encrypted life counter has been added;
- processing said content data file;
- subtracting a specific value from said encrypted life counter each time said content data file is processed; and
- inhibiting said processing means from processing said content data file when the value held by said encrypted life counter has been reduced to a value smaller than said specific value, wherein, when the content data file is copied to a destination file, a value held by the life counter of the content data file being copied is reduced by one half and the reduced value is copied to a life counter of the destination file.

* * * * *

UNITED STATES PATENT AND TRADEMARK OFFICE
CERTIFICATE OF CORRECTION

PATENT NO. : 6,983,373 B2 Page 1 of 1
APPLICATION NO. : 09/895384
DATED : January 3, 2006
INVENTOR(S) : Yoji Furuya It is certified that error appears in the above-identified patent and that said Letters Patent is hereby corrected as shown below:

Drawings,
Sheet 14, Figure 14, "PANNEL" should read -- PANEL --.

Column 5,
Line 58, "frequency" should read -- frequency of --.

Column 13,
Line 22, "printing" should read -- printing of --.

Column 19,
Line 19, "copying" should read -- copy --.

Column 20,
Line 56, "can" should read -- can be --.

Signed and Sealed this

Twentieth Day of June, 2006

JON W. DUDAS
*Director of the United States Patent and Trademark Office*